(12) United States Patent
Heckel

(10) Patent No.: US 11,841,768 B2
(45) Date of Patent: Dec. 12, 2023

(54) MULTI-CLIENT BACKUP DEDUPLICATION APPARATUSES, METHODS AND SYSTEMS

(71) Applicant: Datto, Inc., Norwalk, CT (US)

(72) Inventor: Philipp Heckel, Fairfield, CT (US)

(73) Assignee: DATTO, INC., Norwalk, CT (US)

( * ) Notice: Subject to any disclaimer, the term of this patent is extended or adjusted under 35 U.S.C. 154(b) by 0 days.

(21) Appl. No.: 16/837,992

(22) Filed: Apr. 1, 2020

(65) Prior Publication Data

US 2021/0318934 A1   Oct. 14, 2021

(51) Int. Cl.
*G06F 11/14* (2006.01)
*G06F 3/06* (2006.01)
*G06F 9/455* (2018.01)

(52) U.S. Cl.
CPC .......... *G06F 11/1453* (2013.01); *G06F 3/064* (2013.01); *G06F 3/067* (2013.01); *G06F 3/0619* (2013.01); *G06F 3/0644* (2013.01); *G06F 3/0656* (2013.01); *G06F 3/0683* (2013.01); *G06F 9/45558* (2013.01); *G06F 11/1451* (2013.01); *G06F 11/1461* (2013.01); *G06F 11/1464* (2013.01); *G06F 11/1469* (2013.01); *G06F 2009/45591* (2013.01); *G06F 2009/45595* (2013.01)

(58) Field of Classification Search
CPC .. G06F 11/1453; G06F 3/0644; G06F 3/0683; G06F 3/064; G06F 11/1461; G06F 11/1451; G06F 11/1469; G06F 3/0619; G06F 9/45558; G06F 3/0656; G06F 11/1464; G06F 3/067; G06F 2009/45591; G06F 2009/45595; G06F 3/0608; G06F 3/065; G06F 3/0641; G06F 2009/45562

USPC ................................................. 711/162, 161
See application file for complete search history.

(56) References Cited

U.S. PATENT DOCUMENTS

| 6,785,786 B1 | 8/2004 | Gold |
| 6,847,984 B1 | 1/2005 | Midgley |
| 9,235,582 B1 | 1/2016 | Madiraju Varadaraju |

(Continued)

OTHER PUBLICATIONS

NPL "Forensics: What is the $Bitmap?", Jun. 1, 2009 (Year: 2009).*

(Continued)

*Primary Examiner* — David Yi
*Assistant Examiner* — Zubair Ahmed
(74) *Attorney, Agent, or Firm* — MASCHOFF BRENNAN

(57) ABSTRACT

The Multi-Client Backup Deduplication Apparatuses, Methods and Systems ("MCBD") transforms backup request, restore request, virtual machine initialization request inputs via MCBD components into backup response, restore response, virtual machine initialization response outputs. A backup request identifying a source volume is obtained. The source volume's master file table is retrieved and a file entry is selected. File data runs associated with the selected entry are determined. The file is reassembled in a buffer and split into file chunks Upon determining that a file chunk is not indexed in a chunk index, the file chunk is stored on a target volume and indexed in the chunk index. File chunk slice datastructures that map source volume offset location of file data on the source volume to the corresponding file chunk offset location of that file data in the file chunk on the target volume are generated and stored in a manifest file.

17 Claims, 8 Drawing Sheets

(56) References Cited

U.S. PATENT DOCUMENTS

| | | |
|---|---|---|
| 9,690,666 B1 | 6/2017 | Shembavnekar |
| 9,811,422 B2 | 11/2017 | Bushman |
| 10,204,016 B1 | 2/2019 | Patwardhan |
| 2005/0086443 A1 | 4/2005 | Mizuno |
| 2007/0250671 A1* | 10/2007 | Lyon ............... G06F 11/1453 711/162 |
| 2009/0276454 A1* | 11/2009 | Smith ............. G06F 16/1756 707/999.102 |
| 2010/0100696 A1 | 2/2010 | Suzuki |
| 2011/0282841 A1 | 11/2011 | Saika |
| 2013/0226870 A1 | 8/2013 | Dash |
| 2016/0011790 A1 | 1/2016 | Rostoker |
| 2017/0091047 A1 | 3/2017 | Bangalore |
| 2017/0293628 A1 | 10/2017 | Adler |
| 2017/0329677 A1* | 11/2017 | Crofton ............ G06F 16/2455 |
| 2018/0052621 A1* | 2/2018 | Diel ................. G06F 3/0608 |
| 2018/0173596 A1 | 6/2018 | Petracca |
| 2018/0239555 A1 | 8/2018 | Cao |
| 2019/0079747 A1* | 3/2019 | Sinha ............... G06F 3/0665 |

OTHER PUBLICATIONS

U.S. Appl. No. 16/055,347.
U.S. Appl. No. 16/285,189.
U.S. Appl. No. 16/391,205.
U.S. Appl. No. 16/391,243.
U.S. Appl. No. 16/424,469.
U.S. Appl. No. 16/442,514.
U.S. Appl. No. 16/559,598.
U.S. Appl. No. 16/661,881.
U.S. Appl. No. 16/661,934.
U.S. Appl. No. 16/661,936.
U.S. Appl. No. 16/837,992.
U.S. Appl. No. 16/837,997.
U.S. Appl. No. 62/541,952.

* cited by examiner

FIGURE 2: MCBD DBP COMPONENT

FIGURE 4: MCBD DATA FLOW

FIGURE 5: MCBD RP COMPONENT

FIGURE 6: MCBD DATA FLOW

MULTI-CLIENT BACKUP DEDUPLICATION APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

OTHER APPLICATIONS

Applications of interest include: U.S. patent application Ser. No. 16/661,881, filed Oct. 23, 2019, entitled "Prioritization and Source-Nonspecific Based Virtual Machine Recovery Apparatuses, Methods and Systems".

The entire contents of the aforementioned applications are herein expressly incorporated by reference.

FIELD

The present innovations generally address backup systems, and more particularly, include Multi-Client Backup Deduplication Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Computer system backups are utilized to protect data from being lost due to equipment failures, malware and accidental deletions. A backup may involve copying files to be backed up from one location to another location. For example, files may be copied from a solid-state drive in a user's desktop to an external hard drive that may be connected to the user's desktop via USB.

BRIEF DESCRIPTION OF THE DRAWINGS

Appendices and/or drawings illustrating various, non-limiting, example, innovative aspects of the Multi-Client Backup Deduplication Apparatuses, Methods and Systems (hereinafter "MCBD") disclosure, include.

Figure 1:
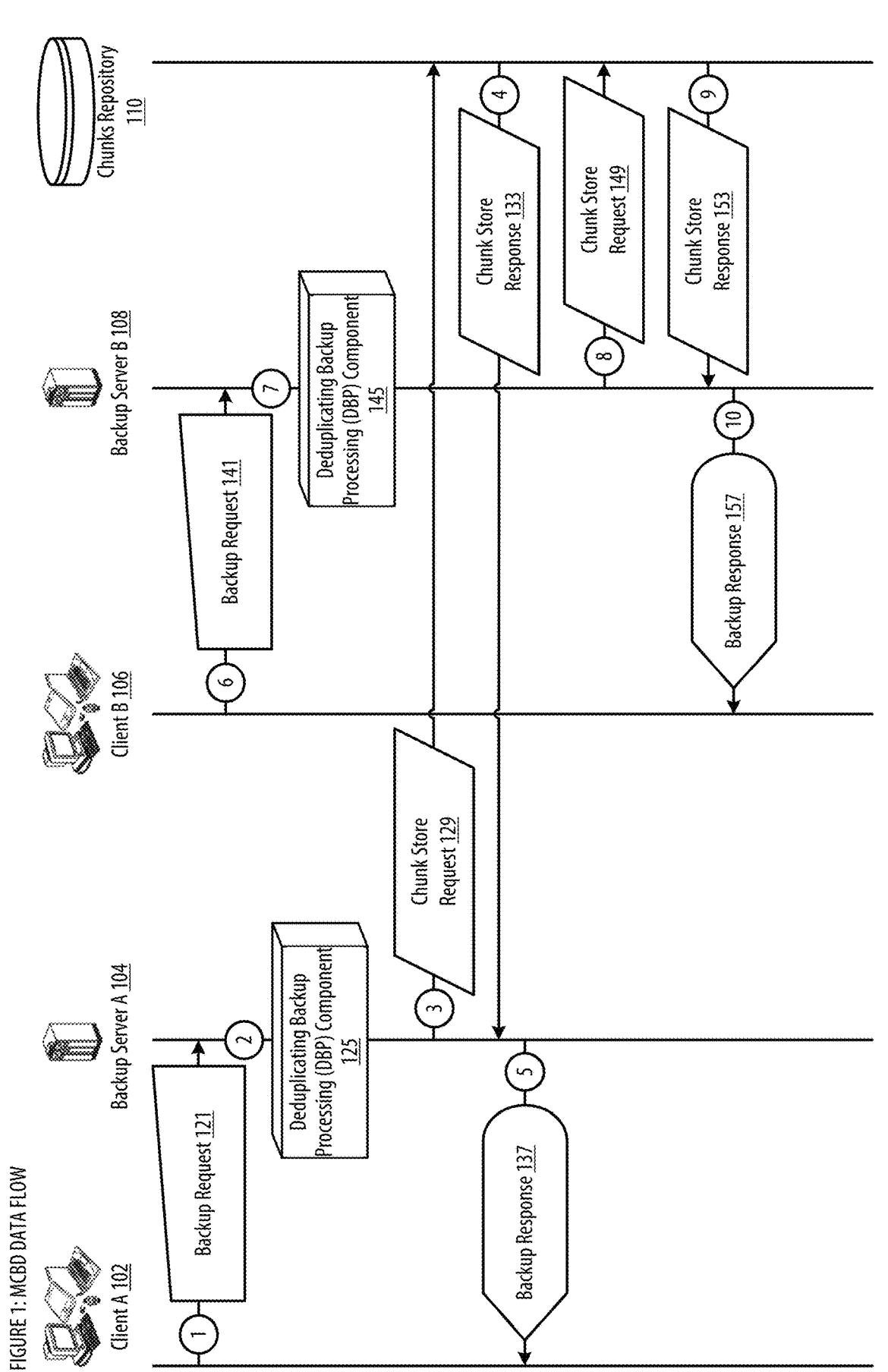
FIG. 1 shows a datagraph illustrating data flow(s) for the MCBD.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Multi-Client Backup Deduplication Apparatuses, Methods and Systems (hereinafter "MCBD") transforms backup request, restore request, virtual machine initialization request inputs, via MCBD components (e.g., DBP, RP, VMH, etc. components), into backup response, restore response, virtual machine initialization response outputs. The MCBD components, in various embodiments, implement advantageous features as set forth below.

INTRODUCTION

The MCBD provides unconventional features (e.g., significant reduction in storage space utilized by a backup device that stores backup data from multiple client devices using deduplication) that were never before available in backup systems.

A backup service provider may store many (e.g., hundreds of thousands) block-level backups (e.g., copies of NTFS file systems) for clients utilizing its services. The MCBD provides significant reduction in storage space utilized for such block-level backups by deduplicating storage used for identical files stored on multiple client file systems (e.g., by storing a single copy of data blocks corresponding to file "word.exe" for clients with installations of Microsoft Word, instead of storing a copy for each client file system).

One approach that could be utilized for deduplication is to deduplicate blocks (e.g., 4K clusters). However, such an approach would produce a lot of metadata and a high metadata-to-data overhead ratio. Further, such an approach would produce a lot of data chunks, resulting in a higher likelihood of hash collisions and necessitating increased hash size, which in turn further increases the overhead ratio. In addition, utilizing a lot of small data chunks may negatively impact performance of storage systems utilized to store the data chunks.

The MCBD uses a combination of content aware chunking (e.g., for the NTFS file system) and fixed offset chunking (e.g., for the files within the file system that meet specified file processing parameters) to implement deduplication. During backups, MCBD creates a manifest file for each NTFS file system to be backed up, which can later be used to recreate a file system from scratch either by restoring the file system from a global chunk store or by mapping it to a drive or mountpoint (e.g., for use by a virtual machine).

MCBD

FIG. 1 shows a datagraph illustrating data flow(s) for the MCBD. In FIG. 1, client A 102 (e.g., of a first user) may send a backup request 121 to backup server A 104 to initiate a backup (e.g., of the first user's hard drive or SSD). For example, client A may be a desktop, a laptop, a tablet, a smartphone, a smartwatch, and/or the like that is executing a client application. It is to be understood that, in some embodiments, a client and a backup server may be components executing on the same hardware device. In one implementation, the backup request may include data such as a request identifier, a device identifier, a source volume identifier, a target volume identifier, a manifest file name, threshold file size, optimization settings, and/or the like. In one embodiment, client A may provide the following example backup request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MCBD.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
```

```
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <backup_request>
        <request_identifier>ID_request_1</request_identifier>
        <device_identifier>ID_client_device_A</device_identifier>
        <source_volume_identifier>C:</source_volume_identifier>
        <target_volume_identifier>ceph:?pool=MCBD</target_volume_identifier>
        <manifest_file_name>CdriveA.manifest</manifest_file_name>
        <threshold_file_size>2MB</threshold_file_size>
        <optimize_empty_space>TRUE</optimize_empty_space>
    </backup_request>
</auth_request>
```

A deduplicating backup processing (DBP) component 125 may utilize data provided in the backup request 121 to perform the first user's backup. See FIG. 2 for additional details regarding the DBP component.

Backup server A 104 may send a chunk store request 129 to a chunks repository 110 to store a backup data chunk (e.g., multiple chunk store requests may be sent during backup). In one implementation, the chunk store request may include data such as a request identifier, a chunk checksum, a chunk size, chunk data, and/or the like. In one embodiment, backup server A may provide the following example chunk store request, substantially in the form of a HTTP(S) POST message including XML-formatted data, as provided below:

```
POST /chunk_store_request.php HTTP/1.1
Host: www.server.com
Content-Type: Application/XML
Content-Length: 667
<?XML version = "1.0" encoding = "UTF-8"?>
<chunk_store_request>
    <request_identifier>ID_request_2</request_identifier>
    <chunk_checksum>AE23983A65...</chunk_checksum>
    <chunk_size>32MB</chunk_size>
    <chunk_data>binary chunk data</chunk_data>
</chunk_store_request>
```

The chunks repository 110 may send a chunk store response 133 to backup server A 104 to confirm that the backup data chunk was stored successfully. In one implementation, the chunk store response may include data such as a response identifier, a status, and/or the like. In one embodiment, the chunks repository may provide the following example chunk store response, substantially in the form of a HTTP(S) POST message including XML-formatted data, as provided below:

```
POST /chunk_store_response.php HTTP/1.1
Host: www.server.com
Content-Type: Application/XML
Content-Length: 667
<?XML version = "1.0" encoding = "UTF-8"?>
<chunk_store_response>
    <response_identifier>ID_response_2</response_identifier>
    <status>OK</status>
</chunk_store_response>
```

Backup server A 104 may send a backup response 137 to client A 102 to inform the first user whether the first user's backup completed successfully. In one implementation, the backup response may include data such as a response identifier, a status, and/or the like. In one embodiment, backup server A may provide the following example backup response, substantially in the form of a HTTP(S) POST message including XML-formatted data, as provided below:

```
POST /backup_response.php HTTP/1.1
Host: www.server.com
Content-Type: Application/XML
Content-Length: 667
<?XML version = "1.0" encoding = "UTF-8"?>
<backup_response>
    <response_identifier>ID_response_1</response_identifier>
    <status>OK</status>
</backup_response>
```

Client B 106 (e.g., of a second user) may send a backup request 141 (e.g., while the first user's backup is executing or at a different time) to backup server B 108 (e.g., backup server B may be the same server as backup server A or a different server) to initiate a backup (e.g., of the second user's hard drive or SSD). For example, client B may be a desktop, a laptop, a tablet, a smartphone, a smartwatch, and/or the like that is executing a client application. In one implementation, the backup request may include data such as a request identifier, a device identifier, a source volume identifier, a target volume identifier, a manifest file name, threshold file size, optimization settings, and/or the like. In one embodiment, client B may provide the following example backup request, substantially in the form of a HTTP(S) POST message including XML-formatted data, as provided below:

```
POST /backup_request.php HTTP/1.1
Host: www.server.com
Content-Type: Application/XML
Content-Length: 667
<?XML version = "1.0" encoding = "UTF-8"?>
<backup_request>
    authentication details
    <request_identifier>ID_request_3</request_identifier>
    <device_identifier>ID_client_device_B</device_identifier>
    <source_volume_identifier>CdriveB.img</source_volume_identifier>
    <target_volume_identifier>ceph:?pool=MCBD</target_volume_identifier>
    <manifest_file_name>CdriveB.manifest</manifest_file_name>
    <threshold_file_size>2MB</threshold_file_size>
    <optimize_empty_space>FALSE</optimize_empty_space>
</backup_request>
```

A deduplicating backup processing (DBP) component 145 may utilize data provided in the backup request 141 to perform the second user's backup. See FIG. 2 for additional details regarding the DBP component.

Backup server B 108 may send a chunk store request 149 to the chunks repository 110 to store a backup data chunk (e.g., multiple chunk store requests may be sent during backup). In one implementation, the chunk store request may include data such as a request identifier, a chunk checksum, a chunk size, chunk data, and/or the like. In one embodiment, backup server B may provide the following example chunk store request, substantially in the form of a HTTP(S) POST message including XML-formatted data, as provided below:

```
POST /chunk_store_request.php HTTP/1.1
Host: www.server.com
Content-Type: Application/XML
Content-Length: 667
<?XML version = "1.0" encoding = "UTF-8"?>
<chunk_store_request>
    <request_identifier>ID_request_4</request_identifier>
    <chunk_checksum>FA7DB910B2...</chunk_checksum>
    <chunk_size>32MB</chunk_size>
    <chunk_data>binary chunk data</chunk_data>
</chunk_store_request>
```

The chunks repository 110 may send a chunk store response 153 to backup server B 108 to confirm that the backup data chunk was stored successfully. In one implementation, the chunk store response may include data such as a response identifier, a status, and/or the like. In one embodiment, the chunks repository may provide the following example chunk store response, substantially in the form of a HTTP(S) POST message including XML-formatted data, as provided below:

```
POST /chunk_store_response.php HTTP/1.1
Host: www.server.com
Content-Type: Application/XML
Content-Length: 667
<?XML version = "1.0" encoding = "UTF-8"?>
<chunk_store_response>
    <response_identifier>ID_response_4</response_identifier>
    <status>OK</status>
</chunk_store_response>
```

Backup server B 108 may send a backup response 157 to client B 106 to inform the second user whether the second user's backup completed successfully. In one implementation, the backup response may include data such as a response identifier, a status, and/or the like. In one embodiment, backup server B may provide the following example backup response, substantially in the form of a HTTP(S) POST message including XML-formatted data, as provided below:

```
POST /backup_response.php HTTP/1.1
Host: www.server.com
Content-Type: Application/XML
Content-Length: 667
<?XML version = "1.0" encoding = "UTF-8"?>
<backup_response>
    <response_identifier>ID_response_3</response_identifier>
    <status>OK</status>
</backup_response>
```

Figure 2:
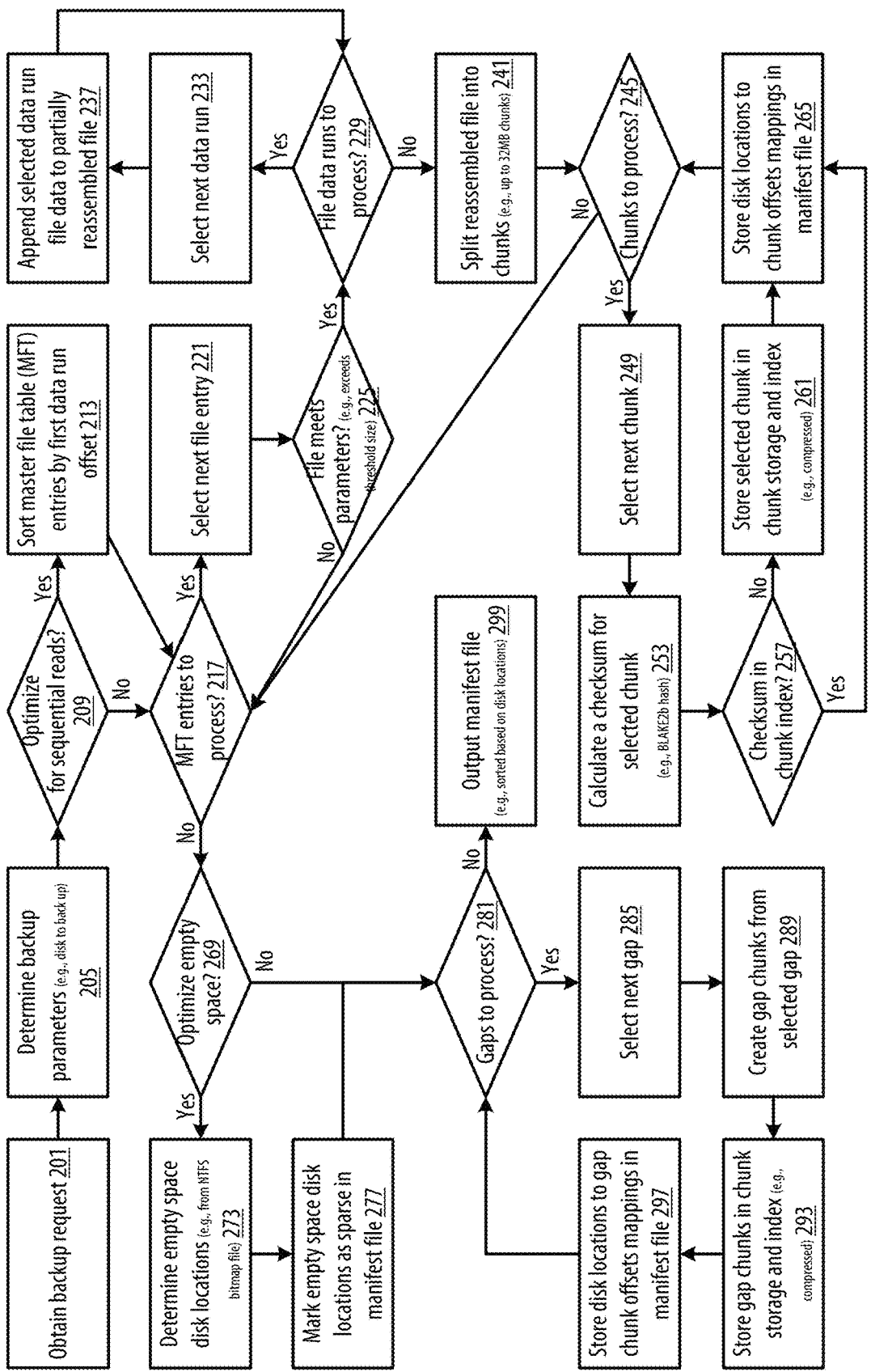
FIG. 2 shows a logic flow illustrating embodiments of a deduplicating backup processing (DBP) component for the MCBD.

FIG. 2 shows a logic flow illustrating embodiments of a deduplicating backup processing (DBP) component for the MCBD. In FIG. 2, a backup request may be obtained at 201. For example, the backup request may be obtained as a result of a request to perform a backup operation from a client.

Backup parameters associated with the requested backup operation may be determined at 205. In one implementation, the backup request may be parsed (e.g., using PHP commands) to determine the backup parameters (e.g., based on the values of the source_volume_identifier, target_volume_identifier, manifest_file_name, optimize_empty_space, etc. fields). For example, such backup parameters may include the source volume (e.g., a volume of a hard drive or SSD, an image file, and/or the like), the target volume (e.g., a folder on a local hard drive or SSD, a distributed storage platform (e.g., Ceph/RADOS), a cloud storage service (e.g., Google Cloud), and/or the like global chunk storage), the name of the manifest file (e.g., that maps source volume locations to chunk offsets of chunks on the target volume), and/or the like. In another implementation, a configuration setting may be checked to determine the backup parameters. For example, such backup parameters may include optimization settings (e.g., whether to optimize for sequential reads, whether to compress stored chunks, whether to optimize empty space, and/or the like), file processing parameters (e.g., threshold file size, files to exclude, and/or the like), chunks parameters (e.g., maximum chunk size, hash function to use for calculating checksums, whether to store file chunks and gap chunks in the same or different locations, and/or the like), and/or the like.

A determination may be made at 209 whether to optimize processing for sequential reads. For example, when reading data from a hard drive, reading data sequentially may provide significant performance improvement. If the optimization settings indicate that processing should be optimized for sequential reads, entries of the source volume's NTFS master file table (MFT) may be sorted to facilitate sequential reading of data from the source volume at 213. In one implementation, the MFT entries may be sorted by first data run offset. For example, if most file entries on the source volume fit in one NTFS data run, and if the file system is not significantly fragmented, this approach should read the disk mostly sequentially.

A determination may be made at 217 whether there remain MFT file entries to process. In one implementation, each of the MFT file entries may be processed. If there remain MFT file entries to process, the next file entry may be selected for processing at 221.

A determination may be made at 225 whether the file associated with the selected file entry meets file processing parameters. In one implementation, a determination may be made whether the file exceeds a threshold size (e.g., 128 KB, 2 MB, etc.). For example, processing of the file may be skipped if the file does not exceed the specified minimum threshold size. In another implementation, a determination may be made whether the file is in the set of excluded files (e.g., temporary files; large computer-specific files, such as pagefile.sys or hiberfil.sys). For example, processing of the file may be skipped if the file is on the list of excluded files.

If the file meets the file processing parameters, a determination may be made at 229 whether there remain file data runs to process. In one implementation, each of the file's data runs may be processed to reassemble the file (e.g., in a buffer). If there remain file data runs to process, the next data run may be selected for processing at 233.

File data corresponding to the selected data run may be appended to the partially reassembled file at 237. For example, the file may be fragmented across multiple data runs on the source volume, and appending file data from the file's data runs reassembles the file. In one implementation, the file data may be appended at the end of data in the buffer used to reassemble the file.

The reassembled file may be split into chunks at 241. For example, the reassembled file may be split into file chunks up to 32 MB each (e.g., chunks other than the last chunk may be set to the maximum chunk size, while the last chunk may be shorter; chunks may be split into substantially equally sized chunks based on the maximum chunk size, such that each chunk $$\text{file size} / \left[ \frac{\text{file size}}{\text{maximum chunk size}} \right].$$

size is substantially equal to: In one embodiment, a set of file chunk slice datastructure instances may be generated to keep track of the file chunks (e.g., file data corresponding to a data run may be stored across multiple file chunks; file data corresponding to multiple data runs may be stored in one file chunk) For example, each file chunk slice datastructure may map source volume offset locations (e.g., source volume from offset and source volume to offset) of file data to corresponding chunk offset locations (e.g., chunk from offset and chunk to offset) of that file data. In one implementation, a file slices map datastructure (e.g., of source volume from offset to file chunk slice datastructure) may be utilized to keep track of the chunks. For example, a file chunk slice datastructure instance may be added to the file slices map datastructure as follows:

```
slices[runOffset] = &chunkSlice{
    checksum:   nil, // fill this for each slice when chunk is processed
    kind:       kindFile, // "kind" indicates that this is a file chunk slice
    diskfrom:   runOffset,
    diskto:     runOffset + int64(runBytesRead),
    chunkfrom:  d.chunk.Size( ),
    chunkto:    d.chunk.Size( ) + int64(runBytesRead),
    length:     int64(runBytesRead),
}
```

A determination may be made at 245 whether there remain chunks of the file to process. In one implementation, each of the file chunks may be processed. If there remain file chunks to process, the next chunk may be selected for processing at 249.

A checksum for the selected chunk may be calculated at 253. For example, BLAKF2b cryptographic hash function may be utilized to calculate the checksum. In one implementation, each of the file chunk slice datastructure instances in the file slices map datastructure corresponding to the selected chunk may be updated with the checksum. For example, the file chunk slice datastructure instances may be updated as follows:

```
// Add slices to disk map
for sliceoffset, slice := range slices {
    slice.checksum = d.chunk.Checksum( ) // update checksum for slice
    d.out.Add(slice) // store slice in manifest file specified by "out"
}
```

A determination may be made at 257 whether the checksum already exists in a global chunk index (e.g., that indexes chunks from multiple clients). In one implementation, chunks may be indexed in the global chunk index using checksums. If the checksum already exists in the global chunk index, the selected chunk does not have to be stored on the target volume again. If the checksum does not yet exist in the global chunk index, the selected chunk may be stored on the target volume and indexed in the global chunk index using the checksum at 261. For example, the selected chunk may be stored and indexed as follows:
    d.store.Write(d.chunk.Checksum( ), d.chunk.Data( )
//"store" specifies target volume
In some implementations, chunks may be stored on the target volume compressed (e.g., using gzip) to save storage space.

Source volume locations to chunk offsets mappings for the selected chunk may be stored in the manifest file at 265. In one implementation, data from each of the file chunk slice datastructure instances in the file slices map datastructure corresponding to the selected chunk may be stored in the manifest file. For example, data from a file chunk slice datastructure instance may be stored in the manifest file as shown in the code example discussed with regard to 253.

A determination may be made at 269 whether to optimize empty space. In one embodiment, unused space may be marked as sparse (e.g., and data in the unused space may not be stored on the target volume). If this optimization is used, a user's restored file system will likely not be identical to the user's backed up file system because unused space is rarely filled with zeros. However, significant space savings may be attained without negative impact on the user. If empty space should be optimized, empty space locations on the source volume may be determined at 273. In one implementation, the source volume's NTFS bitmap file may be parsed to determine the empty space locations. The empty space locations on the source volume may be marked as sparse in the manifest file at 277. In one implementation, a set of sparse chunk slice datastructure instances may be utilized to keep track of the empty space locations. For example, data from a sparse chunk slice datastructure instance may be stored in the manifest file as follows:

```
d.out.Add(&chunkSlice{ // store slice in manifest file specified by "out"
    checksum:    nil, // checksum is not calculated for sparse slices
    kind:        kindSparse, // "kind" indicates that this is a sparse chunk slice
    diskfrom:    sparseSectionStartOffset,
    diskto:      sparseSectionEndOffset,
    chunkfrom:   0,
    chunkto:     sparseSectionLength,
    length:      sparseSectionLength,
})
```

A determination may be made at 281 whether there remain gaps to process. In one embodiment, sections of the source volume that have not been processed (e.g., as qualifying files via 229 through 265, or as empty space via 273 through 277) may be stored using gap chunks. In one implementation, each of the gaps may be processed. If there remain gaps to process, the next gap may be selected for processing at 285. In one implementation, source volume from offsets and source volume to offsets of the generated file chunk slices and/or sparse chunk slices may be analyzed to determine the next gap (e.g., from the last processed "diskto" offset to the next "diskfrom" offset that is not associated with a chunk slice).

A set of gap chunks may be created from the selected gap at 289. In one implementation, file data corresponding to the selected gap may be stored across multiple gap chunks. For example, file data corresponding to the selected gap may be split into chunks based on the maximum chunk size. In another implementation, file data corresponding to the selected gap may be stored in one gap chunk along with file data corresponding to other gaps. For example, file data corresponding to multiple gaps may be stored in one chunk to improve storage efficiency.

The set of gap chunks may be stored on the target volume and indexed in the global chunk index using checksums at 293. In various implementations, gap chunks may be indexed and/or stored in the same global chunk index and/or target volume as file chunks, or in different global chunk index and/or target volume. For example, a gap chunk may be stored and indexed as follows:

d.store.Write(achunk.Checksum( ), achunk.Data( ) //"store" specifies target volume In some implementations, chunks may be stored on the target volume compressed (e.g., using gzip) to save storage space.

Source volume locations to chunk offsets mappings for the set of gap chunks may be stored in the manifest file at 297. In one implementation, a set of gap chunk slice datastructure instances may be utilized to keep track of the selected gap. For example, data from a gap chunk slice datastructure instance may be stored in the manifest file as follows:

```
out.Add(&chunkSlice{ // store slice in manifest file specified by "out"
    checksum:    achunk.Checksum( ), // checksum of the gap chunk
    kind:        kindGap, // "kind" indicates that this is a gap chunk slice
    diskfrom:    currentOffset,
    diskto:      currentOffset + achunk.Size( ),
    chunkfrom:   0,
    chunkto:     achunk.Size( ),
    length:      achunk.Size( ),
})
```

The manifest file may be output at 299. For example, the manifest file may be stored on the client, on a backup server, on the target volume, and/or the like. In some implementations, entries (e.g., chunk slices) in the manifest file may be stored sorted based on "diskfrom" offset.

Figure 3:
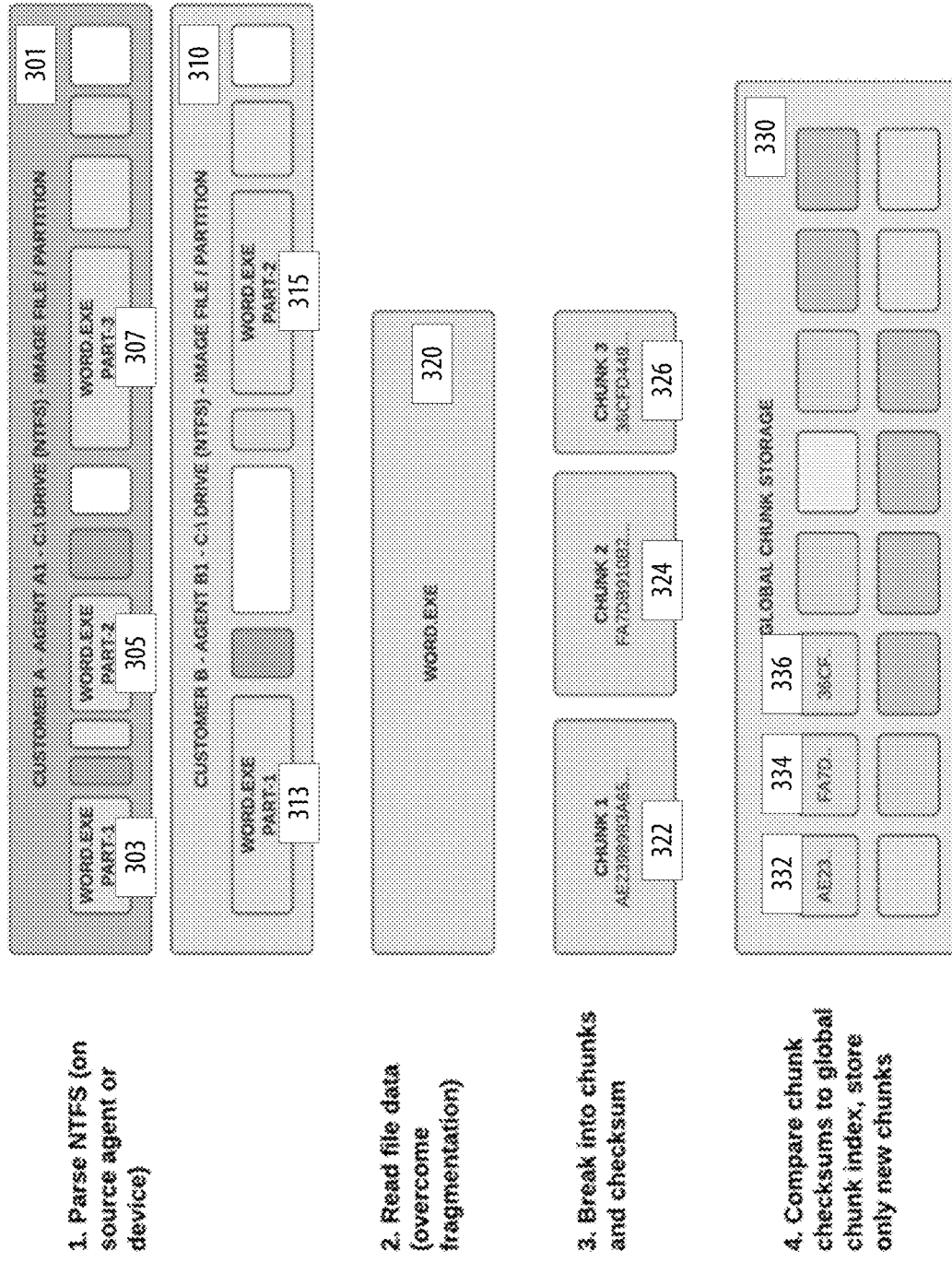
FIG. 3 shows implementation case(s) for the MCBD.

FIG. 3 shows implementation case(s) for the MCBD. In FIG. 3, exemplary processing of MFT file entries to facilitate performing deduplicating backups for two clients is illustrated. Client A 301 and client B 310 each have an MFT file entry for file "WORD.EXE" on their respective "C:" drives (e.g., source volumes). The two files are identical. The file is fragmented on client A's drive and is stored in three data runs 303, 305, and 307. The file is also fragmented on client B's drive and is stored in two data runs 313 and 315.

During a backup (e.g., for both client A and client B), the file is reassembled, and the reassembled file 320 is split into three file chunks 322, 324, and 326 (e.g., sizes of these file chunks may not correspond to data run sizes of any client, and instead may be based on the maximum chunk size). A checksum may be calculated for each of the generated file chunks (e.g., the checksum for chunk 322 may be calculated to be AE23983A65 . . . ).

If client A's drive is backed up first, the generated file chunks may be stored in a global chunk storage (e.g., target volume) 330. For example, chunk 322 may be stored in 332, chunk 324 may be stored in 334, and chunk 326 may be stored in 336. The chunks may be indexed in the global chunk storage using checksum. When a manifest file is generated for client A's drive, the manifest file may specify how each of the three data runs are mapped to the file chunks stored in the global chunk storage.

If client B's drive is backed up second, the generated file chunks do not have to be stored in the global chunk storage again, saving storage space. When a manifest file is generated for client B's drive, the manifest file may specify how each of the two data runs are mapped to the file chunks stored in the global chunk storage.

Figure 4:
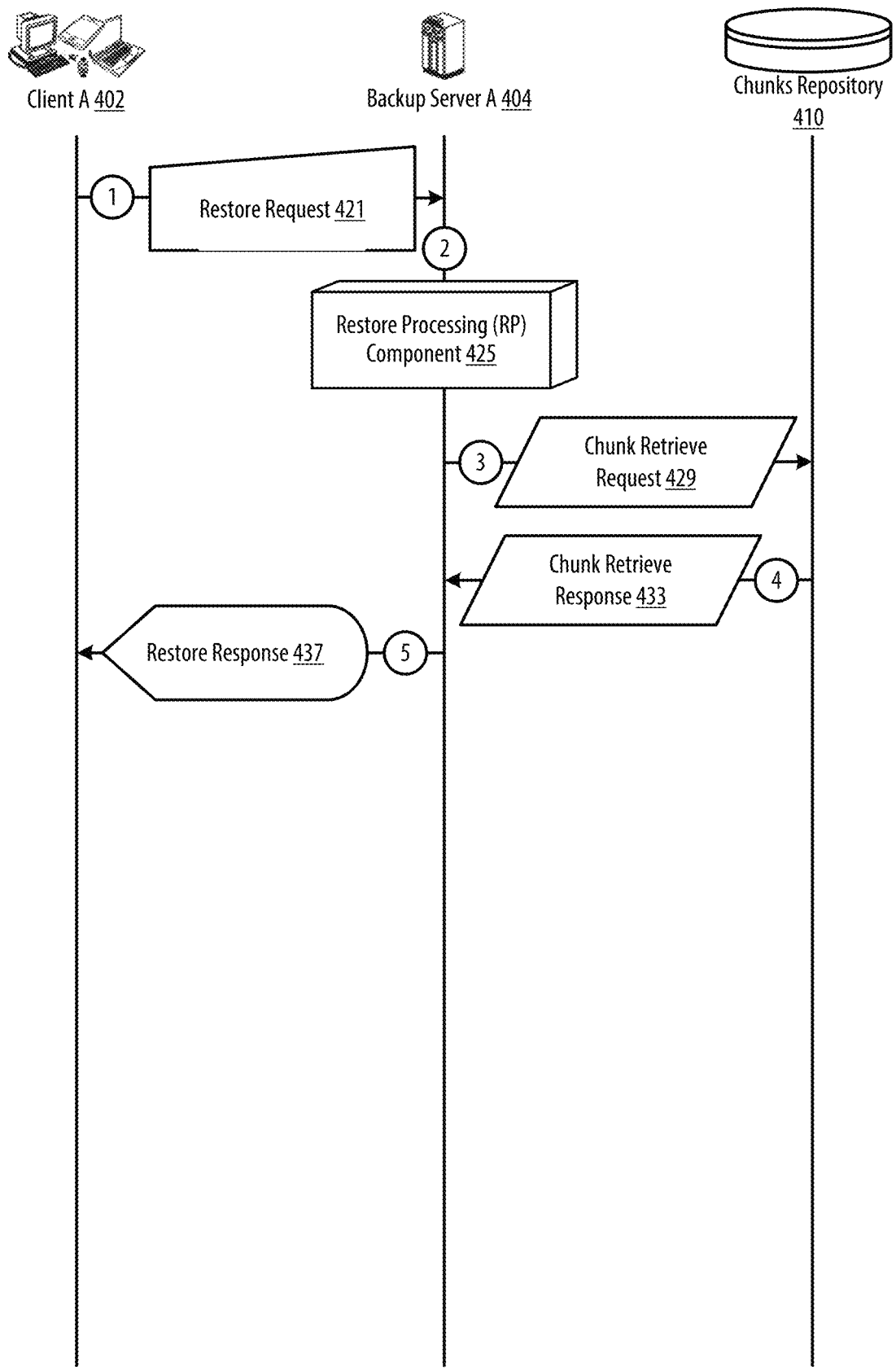
FIG. 4 shows a datagraph illustrating data flow(s) for the MCBD.

FIG. 4 shows a datagraph illustrating data flow(s) for the MCBD. In FIG. 4, client A 402 (e.g., of the first user) may send a restore request 421 to backup server A 404 to initiate a restore (e.g., of the first user's hard drive or SSD). For example, client A may be a desktop, a laptop, a tablet, a smartphone, a smartwatch, and/or the like that is executing a client application. It is to be understood that, in some embodiments, a client and a backup server may be components executing on the same hardware device. In one implementation, the restore request may include data such as a request identifier, a device identifier, a target volume identifier, a restore volume identifier, a manifest file name, and/or the like. In one embodiment, client A may provide the following example restore request, substantially in the form of a HTTP(S) POST message including XML-formatted data, as provided below:

```
POST /restore_request.php HTTP/1.1
Host: www.server.com
Content-Type: Application/XML
Content-Length: 667
<?XML version = "1.0" encoding = "UTF-8"?>
<restore_request>
    authentication details
    <request_identifier>ID_request_11</request_identifier>
    <device_identifier>ID_client_device_A</device_identifier>
    <target_volume_identifier>ceph:?pool=MCBD</target_volume_identifier>
    <restore_volume_identifier>CdriveA.img</restore_volume_identifier>
    <manifest_file_name>CdriveA.manifest</manifest_file_name>
</restore_request>
```

A restore processing (RP) component 425 may utilize data provided in the restore request to restore the first user's backup. See FIG. 5 for additional details regarding the RP component.

Backup server A 404 may send a chunk retrieve request 429 to a chunks repository 410 to retrieve a backup data chunk (e.g., multiple chunk retrieve requests may be sent during restore). In one implementation, the chunk retrieve request may include data such as a request identifier, a chunk checksum, a chunk from offset, a chunk to offset, a chunk size, and/or the like. In one embodiment, backup server A may provide the following example chunk retrieve request, substantially in the form of a HTTP(S) POST message including XML-formatted data, as provided below:

```
POST /chunk_retrieve_request.php HTTP/1.1
Host: www.server.com
Content-Type: Application/XML
Content-Length: 667
<?XML version = "1.0" encoding = "UTF-8"?>
<chunk_retrieve_request>
    <request_identifier>ID_request_12</request_identifier>
    <chunk_checksum>AE23983A65...</chunk_checksum>
    <chunk_from_offset>0</chunk_from_offset>
    <chunk_to_offset>196608</chunk_to_offset>
</chunk_retrieve_request>
```

The chunks repository 410 may send a chunk retrieve response 433 to backup server A 404 with the requested chunk data. In one implementation, the chunk retrieve response may include data such as a response identifier, the requested chunk data, and/or the like. In one embodiment, the chunks repository may provide the following example chunk retrieve response, substantially in the form of a HTTP(S) POST message including XML-formatted data, as provided below:

```
POST /chunk_retrieve_response.php HTTP/1.1
Host: www.server.com
Content-Type: Application/XML
Content-Length: 667
<?XML version = "1.0" encoding = "UTF-8"?>
<chunk_retrieve_response>
    <response_identifier>ID_response_12</response_identifier>
    <chunk_data>binary chunk data (e.g., entire chunk or requested subset)</chunk_data>
</chunk_retrieve_response>
```

Backup server A 404 may send a restore response 437 to client A 402 to inform the first user whether the first user's restore completed successfully. In one implementation, the restore response may include data such as a response identifier, a status, and/or the like. In one embodiment, backup server A may provide the following example restore response, substantially in the form of a HTTP(S) POST message including XML-formatted data, as provided below:

```
POST /restore_response.php HTTP/1.1
Host: www.server.com
Content-Type: Application/XML
Content-Length: 667
<?XML version = "1.0" encoding = "UTF-8"?>
<restore_response>
    <response_identifier>ID_response_11</response_identifier>
    <status>OK</status>
</restore_response>
```

Figure 5:
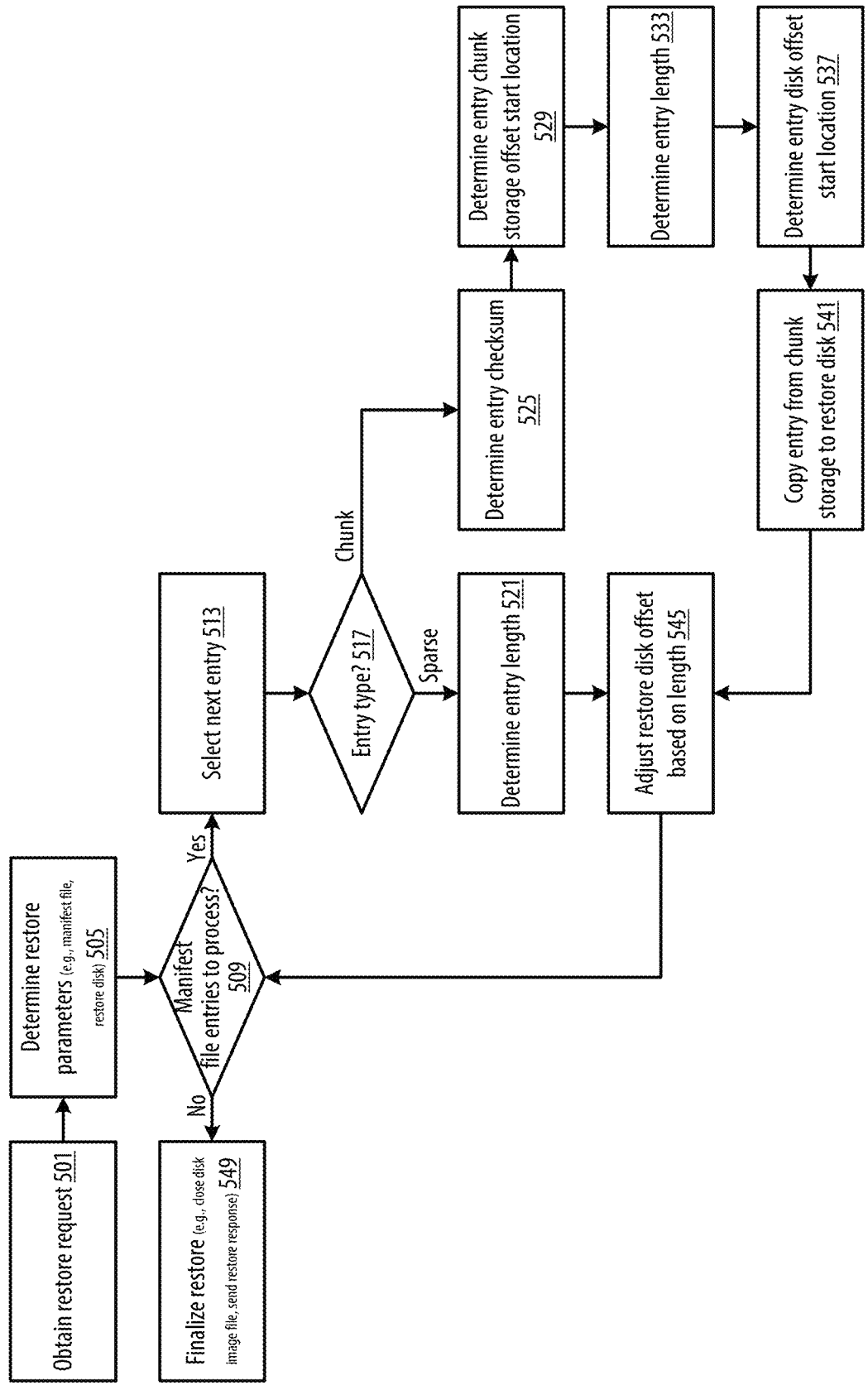
FIG. 5 shows a logic flow illustrating embodiments of a restore processing (RP) component for the MCBD.

FIG. 5 shows a logic flow illustrating embodiments of a restore processing (RP) component for the MCBD. In FIG. 5, a restore request may be obtained at 501. For example, the restore request may be obtained as a result of a request to perform a restore operation from a client.

Restore parameters associated with the requested restore operation may be determined at 505. In one implementation, the restore request may be parsed (e.g., using PHP commands) to determine the restore parameters (e.g., based on the values of the target_volume_identifier, restore_volume_identifier, manifest_file_name, etc. fields). For example, such restore parameters may include the restore volume (e.g., a volume of a hard drive or SSD, an image file, and/or the like), the name of the manifest file (e.g., that maps restore volume locations to chunk offsets of chunks on the target volume), and/or the like. In another implementation, a configuration setting may be checked to determine the restore parameters. For example, such restore parameters may include the target volume (e.g., a folder on a local hard drive or SSD, a distributed storage platform (e.g., Ceph/RADOS), a cloud storage service (e.g., Google Cloud), and/or the like global chunk storage), and/or the like.

A determination may be made at 509 whether there remain manifest file entries to process. In one implementation, each of the manifest file entries may be processed. If there remain manifest file entries to process, the next entry may be selected for processing (e.g., parsing) at 513.

A determination may be made at 517 regarding the entry type of the selected entry. If the selected entry is a sparse entry (e.g., indicating empty space), the disk offset of the restore volume may be adjusted based on the length associated with the sparse entry at 545. In one implementation, the sparse entry may correspond to a sparse chunk slice datastructure (e.g., with "checksum: nil" and "kind: kindSparse"). For example, the disk offset of the restore volume may be adjusted as follows:

```
// manifest file is specified by "manifest"
part := manifest.Get(breakpoint) // "part" is the entry in the manifest file
sparse := part.checksum == nil
length := part.chunkto – part.chunkfrom
if sparse {
    // "offset" is the disk offset where the following entry may be written
    offset += length // adjust disk offset
}
```

If the selected entry is a chunk entry (e.g., a file chunk, a gap chunk), the checksum of the selected entry may be determined at 525. In one implementation, the checksum may be utilized as a key used to identify a chunk to retrieve from the target volume. The location (e.g., chunk storage offset from location and/or chunk storage offset to location) of chunk data associated with the selected entry (e.g., entire chunk or a chunk subset) in the identified chunk on the target volume may be determined at 529. The length associated with the selected entry may be determined at 533. In one implementation, the length may be used to set the size of a buffer. The disk offset of the restore volume where the selected entry should be copied may be determined at 537. The selected entry may be copied from the target volume to the restore volume at 541 and the disk offset of the restore volume may be adjusted based on the length associated with the selected entry at 545. In one implementation, the selected entry may correspond to a file or gap chunk slice datastructure (e.g., with "kind: kindFile" or "kind: kind-Gap"). For example, the selected entry may be copied and the disk offset may be adjusted as follows:

```
// manifest file is specified by "manifest"
part := manifest.Get(breakpoint) // "part" is the entry in the manifest file
sparse := part.checksum == nil
length := part.chunkto – part.chunkfrom
if !sparse {
    buffer := make([ ]byte, manifest.chunkMaxSize) // declare a buffer
    // read slice from target volume specified by "store" into buffer
    store.ReadAt(part.checksum, buffer[:length], part.chunkfrom)
    // write slice from buffer to restore volume specified by "out"
    out.WriteAt(buffer[:length], offset)
    // "offset" is the disk offset where the following entry may be written
    offset += length // adjust disk offset
}
```

The restore operation may be finalized at 549. In one implementation, the restore volume disk image file may be closed (e.g., to flush data to the disk image file). In another implementation, a restore response may be sent to the client (e.g., to inform the client that the restore operation completed; to instruct the client to reboot).

Figure 6:
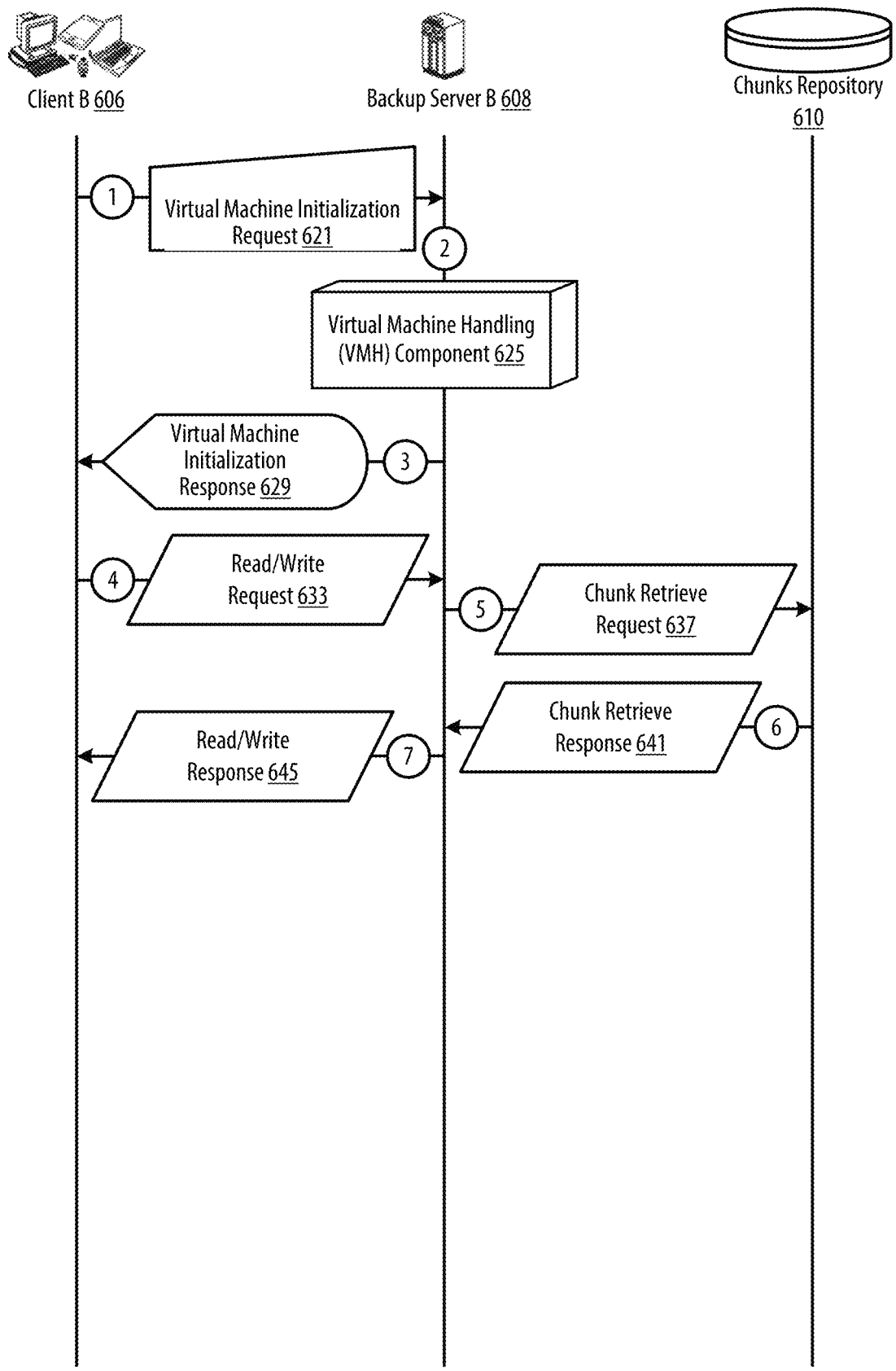
FIG. 6 shows a datagraph illustrating data flow(s) for the MCBD.

FIG. 6 shows a datagraph illustrating data flow(s) for the MCBD. In FIG. 6, client B 606 (e.g., of the second user) may send a virtual machine initialization request 621 to backup server B 608 to initiate booting of a virtual machine from chunks repository 610 (e.g., from a virtual disk of a backed up disk image of the second user's hard drive or SSD) without waiting for a restore operation and/or reassembly of the disk image. For example, client B may be a desktop, a laptop, a tablet, a smartphone, a smartwatch, and/or the like that is executing a client application. It is to be understood that, in some embodiments, a client and a backup server may be components executing on the same hardware device. In one implementation, the virtual machine initialization request may include data such as a request identifier, a device identifier, a target volume identifier, a virtual disk identifier, a copy-on-write (CoW) file name, a manifest file name, and/or the like. In one embodiment, client B may provide the following example virtual machine initialization request, substantially in the form of a HTTP(S) POST message including XML-formatted data, as provided below:

```
POST /virtual_machine_initialization_request.php HTTP/1.1
Host: www.server.com
Content-Type: Application/XML
Content-Length: 667
<?XML version = "1.0" encoding = "UTF-8"?>
<virtual_machine_initialization_request>
    <request_identifier>ID_request_21</request_identifier>
    <device_identifier>ID_client_device_B</device_identifier>
    <target_volume_identifier>ceph:?pool=MCBD</target_volume_identifier>
    <virtual_disk_identifier>/dev/nbd0</virtual_disk_identifier>
    <CoW_file_name>CdriveB.cow</CoW_file_name>
    <manifest_file_name>CdriveB.manifest</manifest_file_name>
</virtual_machine_initialization_request>
```

A virtual machine handling (VMH) component 625 may utilize data provided in the virtual machine initialization request to facilitate handling read and/or write requests to the virtual disk. See FIG. 7 for additional details regarding the VMH component.

Backup server B 608 may send a virtual machine initialization response 629 to client B 606 to inform the second user whether booting of the virtual machine was initiated successfully. In one implementation, the virtual machine initialization response may include data such as a response identifier, a status, and/or the like. In one embodiment, backup server B may provide the following example virtual machine initialization response, substantially in the form of a HTTP(S) POST message including XML-formatted data, as provided below:

```
POST /virtual_machine_initialization_response.php HTTP/1.1
Host: www.server.com
Content-Type: Application/XML
Content-Length: 667
<?XML version = "1.0" encoding = "UTF-8"?>
<virtual_machine_initialization_response>
    <response_identifier>ID_response_21</response_identifier>
    <status>OK</status>
</virtual_machine_initialization_response>
```

Client B 606 may send a read/write request 633 to backup server B 608 to facilitate reading from and/or writing to the virtual disk (e.g., multiple read/write requests may be sent while the virtual machine is operating). In one implementation, the read/write request may include data such as a request identifier, a request type (e.g., read, write), a virtual disk from offset, a virtual disk to offset, length, and/or the like. In one embodiment, client B may provide the following example read/write request, substantially in the form of a HTTP(S) POST message including XML-formatted data, as provided below:

```
POST /read_write_request.php HTTP/1.1
Host: www.server.com
Content-Type: Application/XML
Content-Length: 667
<?XML version = "1.0" encoding = "UTF-8"?>
<read_write_request>
    <request_identifier>ID_request_22</request_identifier>
    <request_type>READ</request_type>
    <virtual_disk_from_offset>288832</virtual_disk_from_offset>
    <virtual_disk_to_offset>759872</virtual_disk_to_offset>
    <length>471040</length>
</read_write_request>
```

Backup server B 608 may send a chunk retrieve request 637 to a chunks repository 610 to retrieve a backup data chunk corresponding to the requested virtual disk data (e.g., data between the virtual disk from offset and the virtual disk to offset). In one implementation, the chunk retrieve request may include data such as a request identifier, a chunk checksum, a chunk from offset, a chunk to offset, a chunk size, and/or the like. In one embodiment, backup server B may provide the following example chunk retrieve request, substantially in the form of a HTTP(S) POST message including XML-formatted data, as provided below:

```
POST /chunk_retrieve_request.php HTTP/1.1
Host: www.server.com
Content-Type: Application/XML
Content-Length: 667
<?XML version = "1.0" encoding = "UTF-8"?>
<chunk_retrieve_request>
    <request_identifier>ID_request_23</request_identifier>
    <chunk_checksum>FA7DB910B2...</chunk_checksum>
    <chunk_from_offset>0</chunk_from_offset>
    <chunk_to_offset>471040</chunk_to_offset>
    <chunk_size>471040</chunk_size>
</chunk_retrieve_request>
```

The chunks repository 610 may send a chunk retrieve response 641 to backup server B 608 with the requested chunk data. In one implementation, the chunk retrieve response may include data such as a response identifier, the requested chunk data, and/or the like. In one embodiment, the chunks repository may provide the following example chunk retrieve response, substantially in the form of a HTTP(S) POST message including XML-formatted data, as provided below:

```
POST /chunk_retrieve_response.php HTTP/1.1
Host: www.server.com
Content-Type: Application/XML
Content-Length: 667
<?XML version = "1.0" encoding = "UTF-8"?>
<chunk_retrieve_response>
    <response_identifier>ID_response_23</response_identifier>
    <chunk_data>binary chunk data (e.g., entire chunk or requested
        subset/</chunk_data>
</chunk_retrieve_response>
```

Backup server B 608 may send a read/write response 645 to client B 606 with the requested virtual disk data. In one implementation, the read/write response may include data such as a response identifier, the requested virtual disk data, and/or the like. In one embodiment, backup server B may provide the following example read/write response, substantially in the form of a HTTP(S) POST message including XML-formatted data, as provided below:

```
POST /read_write_response.php HTTP/1.1
Host: www.server.com
Content-Type: Application/XML
Content-Length: 667
<?XML version = "1.0" encoding = "UTF-8"?>
<read_write_response>
    <response_identifier>ID_response_22</response_identifier>
    <virtual_disk_data>requested virtuaL disk data</virtual_disk_data>
</read_write_response>
```

Figure 7:
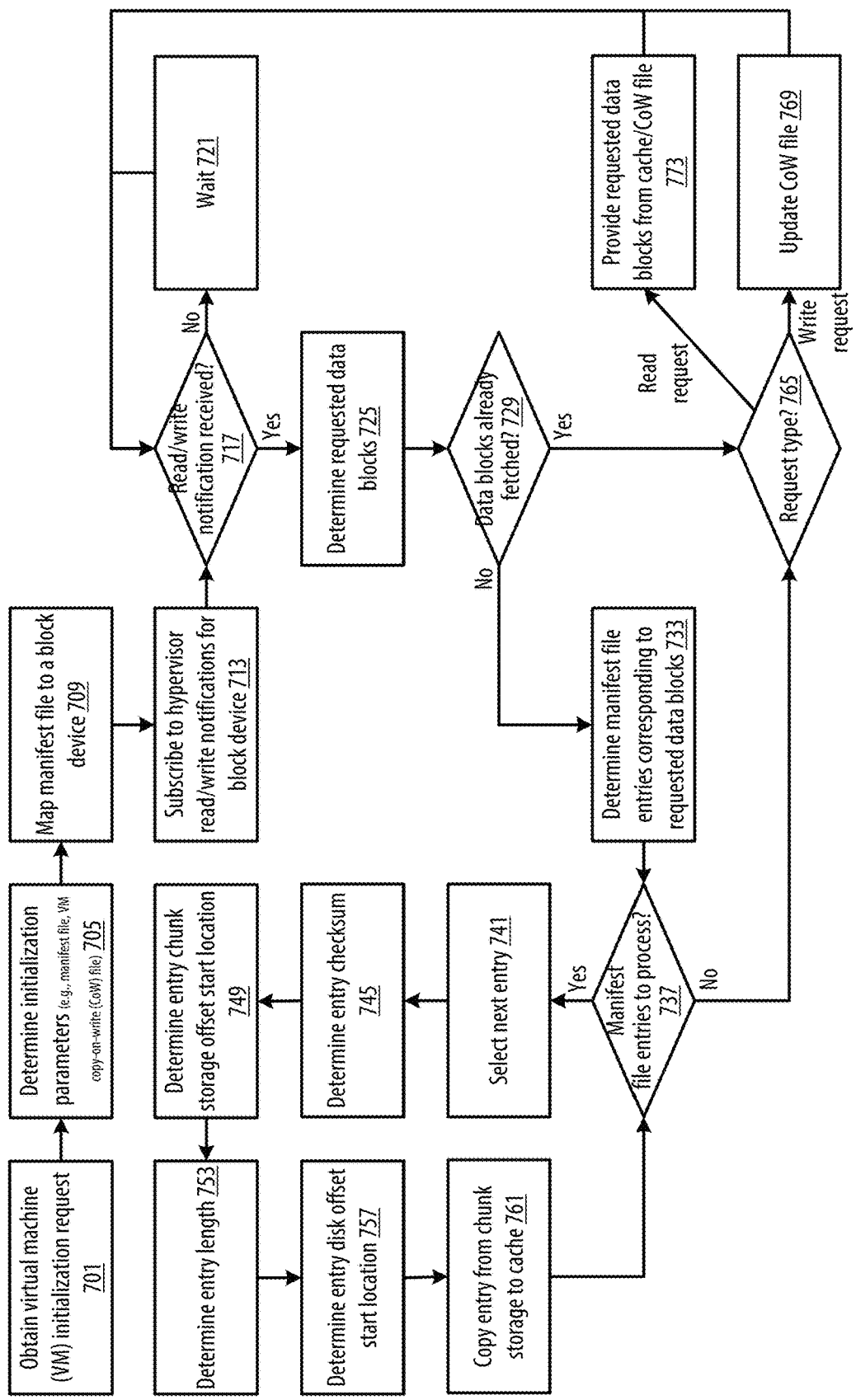
FIG. 7 shows a logic flow illustrating embodiments of a virtual machine handling (VMH) component for the MCBD.

FIG. 7 shows a logic flow illustrating embodiments of a virtual machine handling (VMH) component for the MCBD. In FIG. 7, a virtual machine (VM) initialization request may be obtained at 701. For example, the virtual machine initialization request may be obtained as a result of a request from a client to initiate booting of a virtual machine from a virtual disk mapped to a backed up disk image. In one implementation, a user may send the virtual machine initialization request using the following commands:

```
# map backed up disk image to /dev/nbd0 Linux network block device
(NBD) virtual disk
```

-continued

```
MCBD map CdriveB.manifest CdriveB.cow
# start Linux Kernel-based Virtual Machine (KVM) using the virtual disk
kvm -drive format=raw,file=/dev/nbd0 -serial stdio -m 4G -cpu
host -smp 2
```

Initialization parameters associated with the request to handle read and/or write requests to the virtual disk may be determined at 705. In one implementation, the virtual machine initialization request may be parsed (e.g., using PHP commands) to determine the initialization parameters (e.g., based on the values of the target_volume_identifier, virtual_disk_identifier, CoW_file_name, manifest_file_name, etc. fields). For example, such initialization parameters may include the identifier of the virtual disk (e.g., implemented as a chunk cache; alternatively, a new NBD may be generated by the VMH component during initialization), the name of the CoW file (e.g., that handles writes to the virtual disk), the name of the manifest file (e.g., that maps virtual disk locations to chunk offsets of chunks on the target volume), and/or the like. In another implementation, a configuration setting may be checked to determine the initialization parameters. For example, such initialization parameters may include the target volume (e.g., a folder on a local hard drive or SSD, a distributed storage platform (e.g., Ceph/RADOS), a cloud storage service (e.g., Google Cloud), and/or the like global chunk storage), and/or the like.

The manifest file may be mapped to the virtual disk block device at 709. In one implementation, when a read/write request associated with the virtual disk is detected, the read/write request may be redirected to the backed up disk image associated with the manifest file. For example, the manifest file may be mapped to the virtual disk as follows:

```
type manifestImage struct {
    manifest         *manifest
    store            Chunkstore
    cow_file         *os.File
    cache            Chunkstore
    chunks           map[string]*chunk
    written          map[int64]bool
    sliceCount       map[string]int64
    buffer           [ ]byte
}
// manifest image is specified by "image", virtual disk is implemented by "cache"
image := NewManifestImage(manifest, store, cache, cow_file)
// virtual disk name is specified by "deviceName"
device:= buse.CreateDevice(deviceName, uint(manifest.Size( )), image)
```

The VMH component may subscribe to hypervisor read and/or write notifications for the virtual disk block device at 713. In one implementation, when the virtual machine sends read and/or write requests to the virtual disk, the VMH component may detect and handle such requests. For example, the VMH component may subscribe to hypervisor read and/or write notifications for the virtual disk as follows:

```
// subscribe to read and/or write notifications
sig := make(chan os.Signal)
signal.Notify(sig, os.Interrupt)
device.Connect( )
```

A determination may be made at 717 whether a read and/or write notification for the virtual disk was received. If not, the MCBD may wait at 721 until such a notification is received. Alternatively, the VMH component may terminate execution if a signal termination notification is received (e.g., the virtual disk was unmounted).

If a read and/or write notification for the virtual disk was received, requested data blocks may be determined at 725. In one implementation, a read/write request may be parsed (e.g., using PHP commands) to determine the requested data blocks (e.g., based on the values of the virtual_disk_from_offset, virtual_disk_to_offset, etc. fields). In another implementation, a read/write request may be parsed (e.g., using PHP commands) to determine a requested file name, and the requested data blocks may be determined by retrieving and/or analyzing the MFT of the backed up disk image.

A determination may be made at 729 whether the requested data blocks have already been fetched from the target volume (e.g., already stored in "cache"). If not, manifest file entries corresponding to the requested data blocks may be determined at 733. In one implementation, "diskfrom" and/or "diskto" offsets specified in entries of the manifest file may be compared with the requested data blocks to determine relevant manifest file entries (e.g., those that pertain to the requested data blocks).

A determination may be made at 737 whether there remain manifest file entries to process. In one implementation, each of the relevant manifest file entries may be processed. If there remain manifest file entries to process, the next entry may be selected for processing (e.g., parsing) at 741.

The checksum of the selected entry may be determined at 745. In one implementation, the checksum may be utilized as a key used to identify a chunk to retrieve from the target volume. The location (e.g., chunk storage offset from location and/or chunk storage offset to location) of chunk data associated with the selected entry (e.g., entire chunk or a chunk subset) in the identified chunk on the target volume may be determined at 749. The length associated with the selected entry may be determined at 753. In one implementation, the length may be used to set the size of a buffer. The disk offset of the virtual disk where the selected entry should be copied may be determined at 757.

The selected entry may be copied from the target volume to the virtual disk at 761. For example, the selected entry may correspond to a chunk slice datastructure. In one implementation, the identified chunk may be copied to cache. For example, the identified chunk may be copied to the cache as follows:

```
type Chunkstore interface {
    Stat(checksum [ ]byte) error
    ReadAt(checksum [ ]byte, buffer [ ]byte, offset int64) (int, error)
```

-continued

```
    Write(checksum [ ]byte, buffer [ ]byte) error
    Remove(checksum [ ]byte) error
}
type chunk struct {
    size int64
    data [ ]byte
    checksum [ ]byte
}
// determine length of chunk slice
length := slice.chunkto - slice.chunkfrom
// check if the requested data blocks have already been fetched from
the target volume
// if already fetched, read chunk slice into buffer from cache
read, err := d.cache.ReadAt(slice.checksum, buffer[:length],
slice.chunkfrom)
// if not yet fetched (chunk is not in cache)
if err != nil {
    // read entire chunk from the target volume into buffer
    chunk := d.chunks[slice.checksum]
    read, err := d.store.ReadAt(slice.checksum, buffer[:chunk.size], 0)
    // store entire chunk in cache
    d.cache.Write(slice.checksum, buffer[:chunk.size])
    // adjust buffer to store chunk slice
    buffer = buffer[slice.chunkfrom:slice.chunkto]
}
// store buffer in the CoW file at offset specified by "slice.diskfrom"
d.cow_file.WriteAt(buffer[:length], slice.diskfrom)
```

In another implementation, the chunk slice corresponding to the requested data blocks may be copied to the cache, instead of copying the entire chunk In another implementation, a disk image file may be utilized to implement the cache, instead of a chunk cache, and the chunk slice corresponding to the requested data blocks may be copied to the determined disk offset location of the disk image file.

A determination may be made at 765 whether the notification for the virtual disk is a read request or a write request. If a write request was received, the CoW file may be updated at 769. In one implementation, data blocks to be written may be stored in the CoW file. For example, the CoW file may be updated as follows:

```
// store bytes specified by "p" in the CoW file at offset specified by
"off"
d.cow_file.WriteAt(p, int64(off))
```

If a read request was received, the requested data blocks may be provided from the CoW file or from the cache at 773. In one implementation, data blocks to be read may be retrieved from the CoW file. For example, data blocks may be read from the CoW file as follows:

```
// read bytes specified by "p" from the CoW file at offset specified by
"off"
d.cow_file.ReadAt(p, int64(off))
```

In another implementation, a disk image file may be utilized to implement the cache, instead of a chunk cache, and unmodified data blocks may be read from the disk image file.

MCBD Controller

Figure 8:
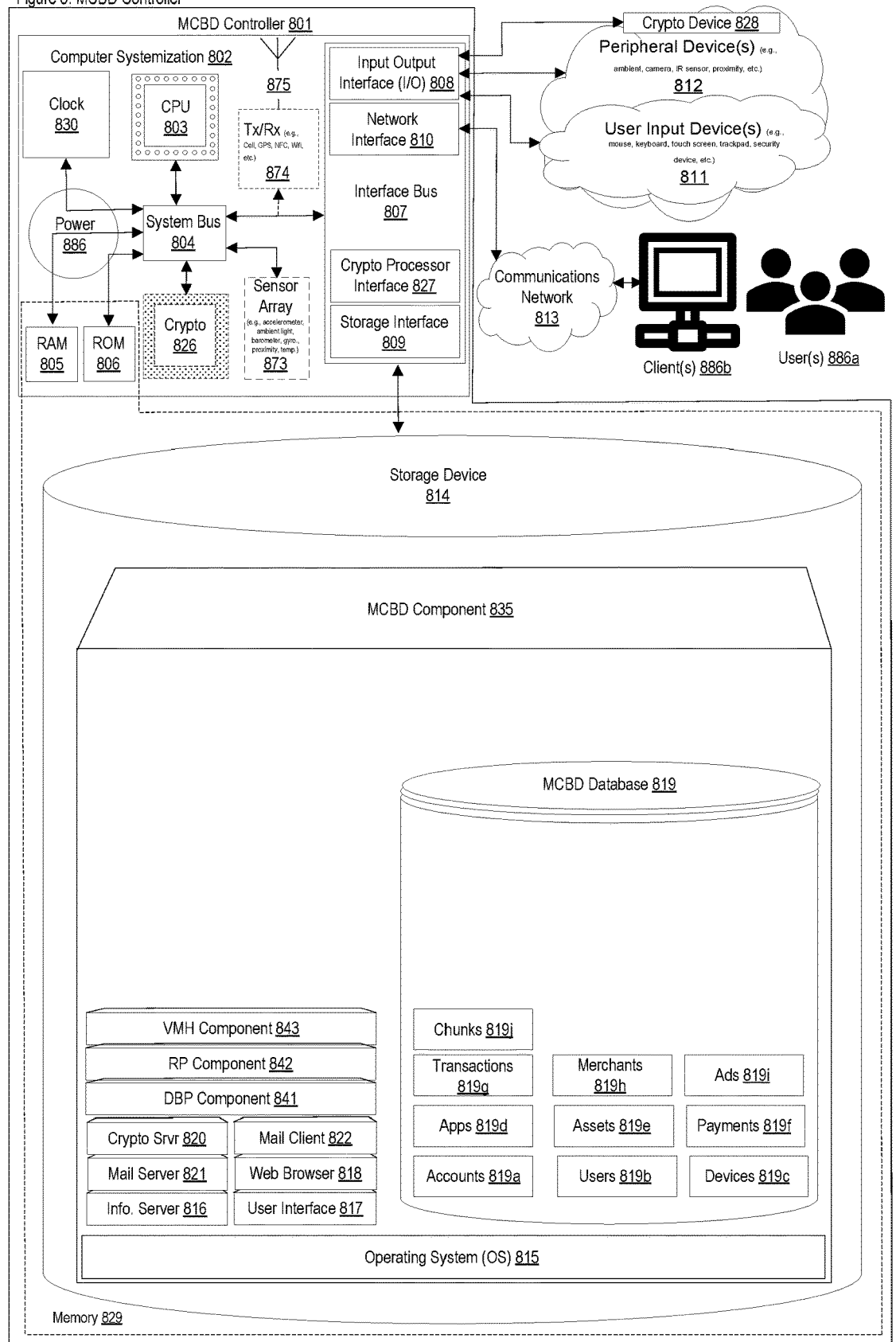
FIG. 8 shows a block diagram illustrating embodiments of a MCBD controller.

FIG. 8 shows a block diagram illustrating embodiments of a MCBD controller. In this embodiment, the MCBD controller 801 may serve to aggregate, process, store, search, serve, identify, instruct, generate, match, and/or facilitate interactions with a computer through backup systems technologies, and/or other related data.

Users, which may be people and/or other systems, may engage information technology systems (e.g., computers) to facilitate information processing. In turn, computers employ processors to process information; such processors 803 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MCBD controller 801 may be connected to and/or communicate with entities such as, but not limited to: one or more users from peripheral devices 812 (e.g., user input devices 811); an optional cryptographic processor device 828; and/or a communications network 813.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WAN s), Wireless Networks (WLANs), etc. For example, the Internet is, generally, an interconnection of a multitude of networks whereby remote clients and servers may access and interoperate with one another.

The MCBD controller 801 may be based on computer systems that may comprise, but are not limited to, components such as: a computer systemization 802 connected to memory 829.

Computer Systemization

A computer systemization 802 may comprise a clock 830, central processing unit ("CPU(s)" and/or "processor(s)" (these terms are used interchangeable throughout the disclosure unless noted to the contrary)) 803, a memory 829 (e.g., a read only memory (ROM) 806, a random access memory (RAM) 805, etc.), and/or an interface bus 807, and most frequently, although not necessarily, are all interconnected and/or communicating through a system bus 804 on one or more (mother)board(s) 802 having conductive and/or otherwise transportive circuit pathways through which instructions (e.g., binary encoded signals) may travel to effectuate communications, operations, storage, etc. The computer systemization may be connected to a power source 886; e.g., optionally the power source may be internal. Optionally, a cryptographic processor 826 may be connected to the system bus. In another embodiment, the cryptographic processor, transceivers (e.g., ICs) 874, and/or sensor array (e.g., accelerometer, altimeter, ambient light, barometer, global positioning system (GPS) (thereby allowing MCBD controller to determine its location), gyroscope, magnetometer, pedometer, proximity, ultra-violet sensor, etc.) 873 may be connected as either internal and/or external peripheral devices 812 via the interface bus I/O 808 (not pictured) and/or directly via the interface bus 807. In turn, the transceivers may be connected to antenna(s) 875, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the MCBD controller and beyond through various interfaces. Should processing requirements dictate a greater amount speed and/or capacity, distributed processors (e.g., see Distributed MCBD below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the MCBD may be achieved by implementing a microcontroller such as CAST's® R8051XC2 microcontroller; Intel's® MCS 51 (i.e., 8051 microcontroller); and/or the like. Also, to implement certain features of the MCBD, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MCBD component collection (distributed or otherwise) and/or features may be implemented via the microprocessor and/or via embedded components; e.g., via ASIC, coprocessor, DSP, FPGA, and/or the like. Alternately, some implementations of the MCBD may be implemented with embedded components that are configured and used to achieve a variety of features or signal processing.

Depending on the particular implementation, the embedded components may include software solutions, hardware solutions, and/or some combination of both hardware/software solutions. For example, MCBD features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the MCBD features. A hierarchy of programmable interconnects allow logic blocks to be interconnected as needed by the MCBD system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MCBD may be developed on FPGAs and then migrated into a fixed version that more resembles ASIC implementations. Alternate or coordinating implementations may migrate MCBD controller features to a final ASIC instead of or in addition to FPGAs. Depending on the implementation all of the aforementioned embedded components and microprocessors may be considered the "CPU" and/or "processor" for the MCBD.

Power Source

The power source 886 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the MCBD thereby providing an electric current to all subsequent components. In one example, the power source 886 is connected to the system bus component 804. In an alternative embodiment, an outside power source 886 is provided through a connection across the I/O 808 interface. For example, a USB and/or IEEE 1394 connection carries both data and power across the connection and is therefore a suitable source of power.

Interface Adapters

Interface bus(ses) 807 may accept, connect, and/or communicate to a number of interface adapters, variously although not necessarily in the form of adapter cards, such as but not limited to: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 810 may accept, communicate, and/or connect to a communications network 813. Through a communications network 813, the MCBD controller is accessible through remote clients 833b (e.g., computers with web browsers) by users 833a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed MCBD below), architectures may similarly be employed to pool, load balance, and/or otherwise decrease/increase the communicative bandwidth required by the MCBD controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to user, peripheral devices 812 (e.g., input devices 811), cryptographic processor devices 828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 812 may be connected and/or communicate to I/O and/or other facilities of the like such as network interfaces, storage interfaces, directly to the interface bus, system bus, the CPU, and/or the like. Peripheral devices may be external, internal and/or part of the MCBD controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 811 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the MCBD controller may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the MCBD controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 829. However, memory is a fungible technology and resource, thus, any number of memory embodiments may be employed in lieu of or in concert with one another. It is to be understood that the MCBD controller and/or a computer systemization may employ various forms of memory 829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 829 will include ROM 806, RAM 805, and a storage device 814. A storage device 814 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/ RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 829 may contain a collection of program and/or database components and/or data such as, but not limited to: operating system component(s) 815 (operating system); information server component(s) 816 (information server); user interface component(s) 817 (user interface); Web browser component(s) 818 (Web browser); database(s) 819; mail server component(s) 821; mail client component(s) 822; cryptographic server component(s) 820 (cryptographic server); the MCBD component(s) 835; and/ or the like (i.e., collectively a component collection). These components may be stored and accessed from the storage devices and/or from storage devices accessible through an interface bus. Although unconventional program components such as those in the component collection may be stored in a local storage device 814, they may also be loaded and/or stored in memory such as: peripheral devices, RAM, remote storage facilities through a communications network, ROM, various forms of memory, and/or the like.

Operating System

The operating system component 815 is an executable program component facilitating the operation of the MCBD controller. The operating system may facilitate access of I/O, network interfaces, peripheral devices, storage devices, and/ or the like. The operating system may be a highly fault tolerant, scalable, and secure system such as: Apple's Macintosh OS X (Server) and macOS®; AT&T Plan 9®; Be OS®; Blackberry's QNX®; Google's Chrome®;

Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MCBD controller to communicate with other entities through a communications network 813. Various communication protocols may be used by the MCBD controller as a subcarrier transport mechanism for interaction, such as, but not limited to: multicast, TCP/IP, UDP, unicast, and/or the like.

Information Server

An information server component 816 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MCBD controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MCBD database 819, operating systems, other program components, user interfaces, Web browsers, and/or the like.

Access to the MCBD database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MCBD. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the MCBD as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 817 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 818 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MCBD enabled nodes. The combined application may be nugatory on systems employing Web browsers.

Mail Server

A mail server component 821 is a stored program component that is executed by a CPU 803. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the MCBD. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the MCBD mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 822 is a stored program component that is executed by a CPU 803. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 820 is a stored program component that is executed by a CPU 803, cryptographic processor 826, cryptographic processor interface 827, cryptographic processor device 828, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the MCBD may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the MCBD component to engage in secure transactions if so desired. The cryptographic component facilitates the secure accessing of resources on the MCBD and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MCBD Database

The MCBD database component 819 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the MCBD database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MCBD database is implemented as a data-structure, the use of the MCBD database 819 may be integrated into another component such as the MCBD component 835. Also, the database may be implemented as a mix of data structures, objects, and relational structures. Databases may be consolidated and/or distributed in countless variations (e.g., see Distributed MCBD below). Portions of databases, e.g., tables, may be exported and/or imported and thus decentralized and/or integrated.

In one embodiment, the database component 819 includes several tables 819a-j:

An accounts table 819a includes fields such as, but not limited to: an accountID, accountOwnerID, accountContactID, asseaIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 819b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a MCBD);

An devices table 819c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 819d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, app Restrictions, portNum, access_API_call, linked_wallets_list, and/or the like;

An assets table 819e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, sub scriptionIDs, assetAuthroizationCode, assetAccessPrivileges, assetPreferences, assetRestrictions, assetAPI, assetAPIconnectionAddress, and/or the like;

A payments table 819f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 819g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 819h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 819i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A chunks table 819j includes fields such as, but not limited to: chunkID, chunkChecksum, chunkSize, chunkBinaryData, and/or the like.

In one embodiment, the MCBD database may interact with other database systems. For example, employing a distributed database system, queries and data access by search MCBD component may treat the combination of the MCBD database, an integrated data security layer database as a single database entity (e.g., see Distributed MCBD below).

In one embodiment, user programs may contain various user interface primitives, which may serve to update the MCBD. Also, various accounts may require custom database tables depending upon the environments and the types of clients the MCBD may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 819a-j. The MCBD may be configured to keep track of various settings, inputs, and parameters via database controllers.

The MCBD database may communicate to and/or with other components in a component collection, including itself, and/or facilities of the like. Most frequently, the MCBD database communicates with the MCBD component, other program components, and/or the like. The database may contain, retain, and provide information regarding other nodes and data.

The MCBDs

The MCBD component 835 is a stored program component that is executed by a CPU. In one embodiment, the MCBD component incorporates any and/or all combinations of the aspects of the MCBD that was discussed in the previous figures. As such, the MCBD affects accessing, obtaining and the provision of information, services, transactions, and/or the like across various communications networks. The features and embodiments of the MCBD discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MCBD's features and facilities, and in many cases reduce the costs, energy consumption/requirements, and extend the life of MCBD's underlying infrastructure; this has the added benefit of making the MCBD more reliable. Similarly, many of the features and mechanisms are designed to be easier for users to use and access, thereby broadening the audience that may enjoy/employ and exploit the feature sets of the MCBD; such ease of use also helps to increase the reliability of the MCBD. In addition, the feature sets include heightened security as noted via the Cryptographic components 820, 826, 828 and throughout, making access to the features and data more reliable and secure The MCBD transforms backup request, restore request, virtual machine initialization request inputs, via MCBD components (e.g., DBP, RP, VMH), into backup response, restore response, virtual machine initialization response outputs.

The MCBD component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the MCBD server employs a cryptographic server to encrypt and decrypt communications. The MCBD component may communicate to and/or with other components in a component collection, including itself, and/or facilities of the like. Most frequently, the MCBD component communicates with the MCBD database, operating systems, other program components, and/or the like. The MCBD may contain, communicate, generate, obtain, and/or provide program component, system, user, and/or data communications, requests, and/or responses.

Distributed MCBDs

The structure and/or operation of any of the MCBD node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the MCBD controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for MCBD controller and/or MCBD component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MCBD controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments may include:

1. A multi-client backup deduplication apparatus, comprising:
   a memory;
   a component collection in the memory, including:
      a deduplicating backup processing component;
   a processor disposed in communication with the memory, and configured to issue a plurality of processing instructions from the component collection stored in the memory,
      wherein the processor issues instructions from the deduplicating backup processing component, stored in the memory, to:
         obtain, via at least one processor, a backup request datastructure associated with a first client, wherein the backup request datastructure identifies a source volume to backup;
         retrieve, via at least one processor, a master file table associated with the source volume;
         select, via at least one processor, from the master file table, a file entry associated with a file;
         determine, via at least one processor, a set of file data runs associated with the selected file entry;
         reassemble, via at least one processor, the file in a buffer using the determined set of file data runs;
         split, via at least one processor, the reassembled file into a set of file chunks in accordance with a specified maximum file chunk size;
         generate, via at least one processor, a file chunk identifier for a file chunk in the set of file chunks;
         determine, via at least one processor, that the file chunk with the generated file chunk identifier is not indexed in a global chunk index;
         store, via at least one processor, the file chunk on a target volume;
         index, via at least one processor, the file chunk in the global chunk index, wherein the global chunk index facilitates retrieving the file chunk from the target volume using the file chunk identifier;
         generate, via at least one processor, a set of file chunk slice datastructures, wherein a file chunk slice datastructure in the set of file chunk slice datastructures maps source volume offset location of file data on the source volume to the corresponding file chunk offset location of that file data in the file chunk on the target volume; and
         store, via at least one processor, the generated set of file chunk slice datastructures in a manifest file associated with the source volume.

2. The apparatus of embodiment 1, further, comprising:
   the processor issues instructions from the deduplicating backup processing component, stored in the memory, to:

obtain, via at least one processor, a backup request datastructure associated with a second client, wherein the backup request datastructure identifies a second source volume to backup;
retrieve, via at least one processor, a second master file table associated with the second source volume;
select, via at least one processor, from the second master file table, a second file entry associated with the file;
determine, via at least one processor, a second set of file data runs associated with the selected second file entry;
reassemble, via at least one processor, the file in a second buffer using the determined second set of file data runs;
split, via at least one processor, the reassembled file into the set of file chunks;
generate, via at least one processor, the file chunk identifier for the file chunk in the set of file chunks;
determine, via at least one processor, that the file chunk with the generated file chunk identifier is already indexed in the global chunk index;
generate, via at least one processor, a second set of file chunk slice datastructures, wherein a file chunk slice datastructure in the second set of file chunk slice datastructures maps source volume offset location of file data on the second source volume to the corresponding file chunk offset location of that file data in the file chunk on the target volume; and
store, via at least one processor, the generated second set of file chunk slice datastructures in a second manifest file associated with the second source volume.

3. The apparatus of embodiment 1, further, comprising:
the processor issues instructions from the deduplicating backup processing component, stored in the memory, to:
sort, via at least one processor, file entries of the retrieved master file table to facilitate sequential reading of data from the source volume.

4. The apparatus of embodiment 3, wherein the file entries are sorted by first data run offset.

5. The apparatus of embodiment 1, wherein the file associated with the selected file entry exceeds a specified minimum threshold size.

6. The apparatus of embodiment 1, wherein the file associated with the selected file entry is not in a specified set of excluded files.

7. The apparatus of embodiment 1, wherein the file chunk identifier for the file chunk is generated by using a cryptographic hash function to calculate a checksum of the file chunk.

8. The apparatus of embodiment 1, wherein the target volume is one of: a distributed storage platform, a cloud storage service.

9. The apparatus of embodiment 1, wherein the file chunk is stored on the target volume compressed.

10. The apparatus of embodiment 1, wherein a file chunk slice datastructure in the generated set of file chunk slice datastructures includes the file chunk identifier of the file chunk.

11. The apparatus of embodiment 1, further, comprising:
the processor issues instructions from the deduplicating backup processing component, stored in the memory, to:
retrieve, via at least one processor, a bitmap file associated with the source volume;
determine, via at least one processor, empty space locations on the source volume using the bitmap file;
generate, via at least one processor, a set of sparse chunk slice datastructures, wherein a sparse chunk slice datastructure in the set of sparse chunk slice datastructures specifies unused space location on the source volume; and
store, via at least one processor, the generated set of sparse chunk slice datastructures in the manifest file associated with the source volume.

12. The apparatus of embodiment 1, further, comprising:
the processor issues instructions from the deduplicating backup processing component, stored in the memory, to:
determine, via at least one processor, a set of gap sections on the source volume;
create, via at least one processor, a gap chunk from a plurality of gap sections in the set of gap sections;
generate, via at least one processor, a gap chunk identifier for the created gap chunk;
store, via at least one processor, the gap chunk on the target volume;
index, via at least one processor, the gap chunk in the global chunk index;
generate, via at least one processor, a set of gap chunk slice datastructures, wherein a gap chunk slice datastructure in the set of gap chunk slice datastructures maps source volume offset location of a gap section on the source volume to the corresponding gap chunk offset location of that gap section in the gap chunk on the target volume; and
store, via at least one processor, the generated set of gap chunk slice datastructures in the manifest file associated with the source volume.

13. The apparatus of embodiment 1, further, comprising:
the processor issues instructions from a restore processing component, stored in the memory, to:
obtain, via at least one processor, a restore request datastructure associated with the first client, wherein the restore request datastructure identifies the manifest file and a restore volume;
select, via at least one processor, a file chunk slice datastructure from the manifest file;
determine, via at least one processor, a file chunk identifier specified in the selected file chunk slice datastructure;
determine, via at least one processor, a file chunk offset location specified in the selected file chunk slice datastructure;
determine, via at least one processor, a source volume offset location specified in the selected file chunk slice datastructure; and
copy, via at least one processor, from the file chunk identified by the specified file chunk identifier and stored on the target volume, the portion identified by the specified file chunk offset location, to the restore volume at location identified by the specified source volume offset location.

14. The apparatus of embodiment 13, wherein the restore volume is an image file.

15. The apparatus of embodiment 1, further, comprising:
the processor issues instructions from a virtual machine handling component, stored in the memory, to:
obtain, via at least one processor, a virtual machine initialization request datastructure associated with the first client, wherein the virtual machine initialization request datastructure identifies the manifest file and a copy-on-write file;
map, via at least one processor, the manifest file to a virtual disk;
subscribe, via at least one processor, to read notifications and write notifications associated with the virtual disk;
obtain, via at least one processor, a notification associated with the virtual disk;
determine, via at least one processor, specified data blocks associated with the notification;
determine, via at least one processor, that the specified data blocks were previously copied from the target volume to a cache associated with the virtual disk; and
use, via at least one processor, the copy-on-write file to handle the notification, wherein a read notification is handled by providing the specified data blocks from the copy-on-write file, and wherein a write notification is handled by updating the specified data blocks in the copy-on-write file.

16. A processor-readable multi-client backup deduplication non-transient physical medium storing processor-executable components, the components, comprising:
a component collection stored in the medium, including:
a deduplicating backup processing component;
wherein the deduplicating backup processing component, stored in the medium, includes processor-issuable instructions to:
obtain, via at least one processor, a backup request datastructure associated with a first client, wherein the backup request datastructure identifies a source volume to backup;
retrieve, via at least one processor, a master file table associated with the source volume;
select, via at least one processor, from the master file table, a file entry associated with a file;
determine, via at least one processor, a set of file data runs associated with the selected file entry;
reassemble, via at least one processor, the file in a buffer using the determined set of file data runs;
split, via at least one processor, the reassembled file into a set of file chunks in accordance with a specified maximum file chunk size;
generate, via at least one processor, a file chunk identifier for a file chunk in the set of file chunks;
determine, via at least one processor, that the file chunk with the generated file chunk identifier is not indexed in a global chunk index;
store, via at least one processor, the file chunk on a target volume;
index, via at least one processor, the file chunk in the global chunk index, wherein the global chunk index facilitates retrieving the file chunk from the target volume using the file chunk identifier;
generate, via at least one processor, a set of file chunk slice datastructures, wherein a file chunk slice datastructure in the set of file chunk slice datastructures maps source volume offset location of file data on the source volume to the corresponding file chunk offset location of that file data in the file chunk on the target volume; and
store, via at least one processor, the generated set of file chunk slice datastructures in a manifest file associated with the source volume.

17. The medium of embodiment 16, further, comprising:
the deduplicating backup processing component, stored in the medium, includes processor-issuable instructions to:
obtain, via at least one processor, a backup request datastructure associated with a second client, wherein the backup request datastructure identifies a second source volume to backup;
retrieve, via at least one processor, a second master file table associated with the second source volume;
select, via at least one processor, from the second master file table, a second file entry associated with the file;
determine, via at least one processor, a second set of file data runs associated with the selected second file entry;
reassemble, via at least one processor, the file in a second buffer using the determined second set of file data runs;
split, via at least one processor, the reassembled file into the set of file chunks;
generate, via at least one processor, the file chunk identifier for the file chunk in the set of file chunks;
determine, via at least one processor, that the file chunk with the generated file chunk identifier is already indexed in the global chunk index;
generate, via at least one processor, a second set of file chunk slice datastructures, wherein a file chunk slice datastructure in the second set of file chunk slice datastructures maps source volume offset location of file data on the second source volume to the corresponding file chunk offset location of that file data in the file chunk on the target volume; and
store, via at least one processor, the generated second set of file chunk slice datastructures in a second manifest file associated with the second source volume.

18. The medium of embodiment 16, further, comprising:
the deduplicating backup processing component, stored in the medium, includes processor-issuable instructions to:
sort, via at least one processor, file entries of the retrieved master file table to facilitate sequential reading of data from the source volume.

19. The medium of embodiment 18, wherein the file entries are sorted by first data run offset.

20. The medium of embodiment 16, wherein the file associated with the selected file entry exceeds a specified minimum threshold size.

21. The medium of embodiment 16, wherein the file associated with the selected file entry is not in a specified set of excluded files.

22. The medium of embodiment 16, wherein the file chunk identifier for the file chunk is generated by using a cryptographic hash function to calculate a checksum of the file chunk.

23. The medium of embodiment 16, wherein the target volume is one of: a distributed storage platform, a cloud storage service.

24. The medium of embodiment 16, wherein the file chunk is stored on the target volume compressed.

25. The medium of embodiment 16, wherein a file chunk slice datastructure in the generated set of file chunk slice datastructures includes the file chunk identifier of the file chunk.

26. The medium of embodiment 16, further, comprising:
the deduplicating backup processing component, stored in the medium, includes processor-issuable instructions to:
retrieve, via at least one processor, a bitmap file associated with the source volume;
determine, via at least one processor, empty space locations on the source volume using the bitmap file;
generate, via at least one processor, a set of sparse chunk slice datastructures, wherein a sparse chunk slice datastructure in the set of sparse chunk slice datastructures specifies unused space location on the source volume; and
store, via at least one processor, the generated set of sparse chunk slice datastructures in the manifest file associated with the source volume.

27. The medium of embodiment 16, further, comprising:
the deduplicating backup processing component, stored in the medium, includes processor-issuable instructions to:
determine, via at least one processor, a set of gap sections on the source volume;
create, via at least one processor, a gap chunk from a plurality of gap sections in the set of gap sections;
generate, via at least one processor, a gap chunk identifier for the created gap chunk;
store, via at least one processor, the gap chunk on the target volume;
index, via at least one processor, the gap chunk in the global chunk index;
generate, via at least one processor, a set of gap chunk slice datastructures, wherein a gap chunk slice datastructure in the set of gap chunk slice datastructures maps source volume offset location of a gap section on the source volume to the corresponding gap chunk offset location of that gap section in the gap chunk on the target volume; and
store, via at least one processor, the generated set of gap chunk slice datastructures in the manifest file associated with the source volume.

28. The medium of embodiment 16, further, comprising:
the component collection stored in the medium, including:
a restore processing component;
wherein the restore processing component, stored in the medium, includes processor-issuable instructions to:
obtain, via at least one processor, a restore request datastructure associated with the first client, wherein the restore request datastructure identifies the manifest file and a restore volume;
select, via at least one processor, a file chunk slice datastructure from the manifest file;
determine, via at least one processor, a file chunk identifier specified in the selected file chunk slice datastructure;
determine, via at least one processor, a file chunk offset location specified in the selected file chunk slice datastructure;
determine, via at least one processor, a source volume offset location specified in the selected file chunk slice datastructure; and
copy, via at least one processor, from the file chunk identified by the specified file chunk identifier and stored on the target volume, the portion identified by the specified file chunk offset location, to the restore volume at location identified by the specified source volume offset location.

29. The medium of embodiment 28, wherein the restore volume is an image file.

30. The medium of embodiment 16, further, comprising:
a virtual machine handling component;
wherein the virtual machine handling component, stored in the medium, includes processor-issuable instructions to:
obtain, via at least one processor, a virtual machine initialization request datastructure associated with the first client, wherein the virtual machine initialization request datastructure identifies the manifest file and a copy-on-write file;
map, via at least one processor, the manifest file to a virtual disk;
subscribe, via at least one processor, to read notifications and write notifications associated with the virtual disk;
obtain, via at least one processor, a notification associated with the virtual disk;
determine, via at least one processor, specified data blocks associated with the notification;
determine, via at least one processor, that the specified data blocks were previously copied from the target volume to a cache associated with the virtual disk; and
use, via at least one processor, the copy-on-write file to handle the notification, wherein a read notification is handled by providing the specified data blocks from the copy-on-write file, and wherein a write notification is handled by updating the specified data blocks in the copy-on-write file.

31. A processor-implemented multi-client backup deduplication system, comprising:
a deduplicating backup processing component means, to:
obtain, via at least one processor, a backup request datastructure associated with a first client, wherein the backup request datastructure identifies a source volume to backup;
retrieve, via at least one processor, a master file table associated with the source volume;
select, via at least one processor, from the master file table, a file entry associated with a file;
determine, via at least one processor, a set of file data runs associated with the selected file entry;
reassemble, via at least one processor, the file in a buffer using the determined set of file data runs;
split, via at least one processor, the reassembled file into a set of file chunks in accordance with a specified maximum file chunk size;
generate, via at least one processor, a file chunk identifier for a file chunk in the set of file chunks;
determine, via at least one processor, that the file chunk with the generated file chunk identifier is not indexed in a global chunk index;
store, via at least one processor, the file chunk on a target volume;
index, via at least one processor, the file chunk in the global chunk index, wherein the global chunk index facilitates retrieving the file chunk from the target volume using the file chunk identifier;
generate, via at least one processor, a set of file chunk slice datastructures, wherein a file chunk slice datastructure in the set of file chunk slice datastructures maps source volume offset location of file data on the source volume to the corresponding file chunk offset location of that file data in the file chunk on the target volume; and store, via at least one processor, the generated set of file chunk slice datastructures in a manifest file associated with the source volume.

32. The system of embodiment 31, further, comprising:
the deduplicating backup processing component means, to:
obtain, via at least one processor, a backup request datastructure associated with a second client, wherein the backup request datastructure identifies a second source volume to backup;
retrieve, via at least one processor, a second master file table associated with the second source volume;
select, via at least one processor, from the second master file table, a second file entry associated with the file;
determine, via at least one processor, a second set of file data runs associated with the selected second file entry;
reassemble, via at least one processor, the file in a second buffer using the determined second set of file data runs;
split, via at least one processor, the reassembled file into the set of file chunks;
generate, via at least one processor, the file chunk identifier for the file chunk in the set of file chunks;
determine, via at least one processor, that the file chunk with the generated file chunk identifier is already indexed in the global chunk index;
generate, via at least one processor, a second set of file chunk slice datastructures, wherein a file chunk slice datastructure in the second set of file chunk slice datastructures maps source volume offset location of file data on the second source volume to the corresponding file chunk offset location of that file data in the file chunk on the target volume; and
store, via at least one processor, the generated second set of file chunk slice datastructures in a second manifest file associated with the second source volume.

33. The system of embodiment 31, further, comprising:
the deduplicating backup processing component means, to:
sort, via at least one processor, file entries of the retrieved master file table to facilitate sequential reading of data from the source volume.

34. The system of embodiment 33, wherein the file entries are sorted by first data run offset.

35. The system of embodiment 31, wherein the file associated with the selected file entry exceeds a specified minimum threshold size.

36. The system of embodiment 31, wherein the file associated with the selected file entry is not in a specified set of excluded files.

37. The system of embodiment 31, wherein the file chunk identifier for the file chunk is generated by using a cryptographic hash function to calculate a checksum of the file chunk.

38. The system of embodiment 31, wherein the target volume is one of: a distributed storage platform, a cloud storage service.

39. The system of embodiment 31, wherein the file chunk is stored on the target volume compressed.

40. The system of embodiment 31, wherein a file chunk slice datastructure in the generated set of file chunk slice datastructures includes the file chunk identifier of the file chunk.

41. The system of embodiment 31, further, comprising:
the deduplicating backup processing component means, to:
retrieve, via at least one processor, a bitmap file associated with the source volume;
determine, via at least one processor, empty space locations on the source volume using the bitmap file;
generate, via at least one processor, a set of sparse chunk slice datastructures, wherein a sparse chunk slice datastructure in the set of sparse chunk slice datastructures specifies unused space location on the source volume; and
store, via at least one processor, the generated set of sparse chunk slice datastructures in the manifest file associated with the source volume.

42. The system of embodiment 31, further, comprising:
the deduplicating backup processing component means, to:
determine, via at least one processor, a set of gap sections on the source volume;
create, via at least one processor, a gap chunk from a plurality of gap sections in the set of gap sections;
generate, via at least one processor, a gap chunk identifier for the created gap chunk;
store, via at least one processor, the gap chunk on the target volume;
index, via at least one processor, the gap chunk in the global chunk index;
generate, via at least one processor, a set of gap chunk slice datastructures, wherein a gap chunk slice datastructure in the set of gap chunk slice datastructures maps source volume offset location of a gap section on the source volume to the corresponding gap chunk offset location of that gap section in the gap chunk on the target volume; and
store, via at least one processor, the generated set of gap chunk slice datastructures in the manifest file associated with the source volume.

43. The system of embodiment 31, further, comprising:
a restore processing component means, to:
obtain, via at least one processor, a restore request datastructure associated with the first client, wherein the restore request datastructure identifies the manifest file and a restore volume;
select, via at least one processor, a file chunk slice datastructure from the manifest file;
determine, via at least one processor, a file chunk identifier specified in the selected file chunk slice datastructure;
determine, via at least one processor, a file chunk offset location specified in the selected file chunk slice datastructure;
determine, via at least one processor, a source volume offset location specified in the selected file chunk slice datastructure; and
copy, via at least one processor, from the file chunk identified by the specified file chunk identifier and stored on the target volume, the portion identified by the specified file chunk offset location, to the restore volume at location identified by the specified source volume offset location.

44. The system of embodiment 43, wherein the restore volume is an image file.

45. The system of embodiment 31, further, comprising:
a virtual machine handling component means, to:
obtain, via at least one processor, a virtual machine initialization request datastructure associated with the first client, wherein the virtual machine initialization request datastructure identifies the manifest file and a copy-on-write file;

map, via at least one processor, the manifest file to a virtual disk;

subscribe, via at least one processor, to read notifications and write notifications associated with the virtual disk;

obtain, via at least one processor, a notification associated with the virtual disk;

determine, via at least one processor, specified data blocks associated with the notification;

determine, via at least one processor, that the specified data blocks were previously copied from the target volume to a cache associated with the virtual disk; and use, via at least one processor, the copy-on-write file to handle the notification, wherein a read notification is handled by providing the specified data blocks from the copy-on-write file, and wherein a write notification is handled by updating the specified data blocks in the copy-on-write file.

46. A processor-implemented multi-client backup deduplication method, comprising:

executing processor-implemented deduplicating backup processing component instructions to:

obtain, via at least one processor, a backup request datastructure associated with a first client, wherein the backup request datastructure identifies a source volume to backup;

retrieve, via at least one processor, a master file table associated with the source volume;

select, via at least one processor, from the master file table, a file entry associated with a file;

determine, via at least one processor, a set of file data runs associated with the selected file entry;

reassemble, via at least one processor, the file in a buffer using the determined set of file data runs;

split, via at least one processor, the reassembled file into a set of file chunks in accordance with a specified maximum file chunk size;

generate, via at least one processor, a file chunk identifier for a file chunk in the set of file chunks;

determine, via at least one processor, that the file chunk with the generated file chunk identifier is not indexed in a global chunk index;

store, via at least one processor, the file chunk on a target volume;

index, via at least one processor, the file chunk in the global chunk index, wherein the global chunk index facilitates retrieving the file chunk from the target volume using the file chunk identifier;

generate, via at least one processor, a set of file chunk slice datastructures, wherein a file chunk slice datastructure in the set of file chunk slice datastructures maps source volume offset location of file data on the source volume to the corresponding file chunk offset location of that file data in the file chunk on the target volume; and store, via at least one processor, the generated set of file chunk slice datastructures in a manifest file associated with the source volume.

47. The method of embodiment 46, further, comprising:

executing processor-implemented deduplicating backup processing component instructions to:

obtain, via at least one processor, a backup request datastructure associated with a second client, wherein the backup request datastructure identifies a second source volume to backup;

retrieve, via at least one processor, a second master file table associated with the second source volume;

select, via at least one processor, from the second master file table, a second file entry associated with the file;

determine, via at least one processor, a second set of file data runs associated with the selected second file entry;

reassemble, via at least one processor, the file in a second buffer using the determined second set of file data runs;

split, via at least one processor, the reassembled file into the set of file chunks;

generate, via at least one processor, the file chunk identifier for the file chunk in the set of file chunks;

determine, via at least one processor, that the file chunk with the generated file chunk identifier is already indexed in the global chunk index;

generate, via at least one processor, a second set of file chunk slice datastructures, wherein a file chunk slice datastructure in the second set of file chunk slice datastructures maps source volume offset location of file data on the second source volume to the corresponding file chunk offset location of that file data in the file chunk on the target volume; and store, via at least one processor, the generated second set of file chunk slice datastructures in a second manifest file associated with the second source volume.

48. The method of embodiment 46, further, comprising:

executing processor-implemented deduplicating backup processing component instructions to:

sort, via at least one processor, file entries of the retrieved master file table to facilitate sequential reading of data from the source volume.

49. The method of embodiment 48, wherein the file entries are sorted by first data run offset.

50. The method of embodiment 46, wherein the file associated with the selected file entry exceeds a specified minimum threshold size.

51. The method of embodiment 46, wherein the file associated with the selected file entry is not in a specified set of excluded files.

52. The method of embodiment 46, wherein the file chunk identifier for the file chunk is generated by using a cryptographic hash function to calculate a checksum of the file chunk.

53. The method of embodiment 46, wherein the target volume is one of: a distributed storage platform, a cloud storage service.

54. The method of embodiment 46, wherein the file chunk is stored on the target volume compressed.

55. The method of embodiment 46, wherein a file chunk slice datastructure in the generated set of file chunk slice datastructures includes the file chunk identifier of the file chunk.

56. The method of embodiment 46, further, comprising:

executing processor-implemented deduplicating backup processing component instructions to:

retrieve, via at least one processor, a bitmap file associated with the source volume;

determine, via at least one processor, empty space locations on the source volume using the bitmap file;

generate, via at least one processor, a set of sparse chunk slice datastructures, wherein a sparse chunk slice datastructure in the set of sparse chunk slice datastructures specifies unused space location on the source volume; and store, via at least one processor, the generated set of sparse chunk slice datastructures in the manifest file associated with the source volume.

57. The method of embodiment 46, further, comprising:
executing processor-implemented deduplicating backup processing component instructions to:
determine, via at least one processor, a set of gap sections on the source volume;
create, via at least one processor, a gap chunk from a plurality of gap sections in the set of gap sections;
generate, via at least one processor, a gap chunk identifier for the created gap chunk;
store, via at least one processor, the gap chunk on the target volume;
index, via at least one processor, the gap chunk in the global chunk index;
generate, via at least one processor, a set of gap chunk slice datastructures, wherein a gap chunk slice datastructure in the set of gap chunk slice datastructures maps source volume offset location of a gap section on the source volume to the corresponding gap chunk offset location of that gap section in the gap chunk on the target volume; and
store, via at least one processor, the generated set of gap chunk slice datastructures in the manifest file associated with the source volume.

58. The method of embodiment 46, further, comprising:
executing processor-implemented restore processing component instructions to:
obtain, via at least one processor, a restore request datastructure associated with the first client, wherein the restore request datastructure identifies the manifest file and a restore volume;
select, via at least one processor, a file chunk slice datastructure from the manifest file;
determine, via at least one processor, a file chunk identifier specified in the selected file chunk slice datastructure;
determine, via at least one processor, a file chunk offset location specified in the selected file chunk slice datastructure;
determine, via at least one processor, a source volume offset location specified in the selected file chunk slice datastructure; and
copy, via at least one processor, from the file chunk identified by the specified file chunk identifier and stored on the target volume, the portion identified by the specified file chunk offset location, to the restore volume at location identified by the specified source volume offset location.

59. The method of embodiment 58, wherein the restore volume is an image file.

60. The method of embodiment 46, further, comprising:
executing processor-implemented virtual machine handling component instructions to:
obtain, via at least one processor, a virtual machine initialization request datastructure associated with the first client, wherein the virtual machine initialization request datastructure identifies the manifest file and a copy-on-write file;
map, via at least one processor, the manifest file to a virtual disk;
subscribe, via at least one processor, to read notifications and write notifications associated with the virtual disk;
obtain, via at least one processor, a notification associated with the virtual disk;
determine, via at least one processor, specified data blocks associated with the notification;
determine, via at least one processor, that the specified data blocks were previously copied from the target volume to a cache associated with the virtual disk; and
use, via at least one processor, the copy-on-write file to handle the notification, wherein a read notification is handled by providing the specified data blocks from the copy-on-write file, and wherein a write notification is handled by updating the specified data blocks in the copy-on-write file.

In order to address various issues and advance the art, the entirety of this application for Multi-Client Backup Deduplication Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MCBD individual and/or enterprise user, database configuration and/or relational model, data type, data transmission and/or network framework, syntax structure, and/or the like, various embodiments of the MCBD, may be implemented that allow a great deal of flexibility and customization. For example, aspects of the MCBD may be adapted for storage management systems. While various embodiments and discussions of the MCBD have included backup systems, however, it is to be understood that the embodiments described herein may be readily configured and/or customized for a wide variety of other applications and/or implementations.

What is claimed is:

1. A multi-client backup deduplication apparatus, comprising:
    a memory;
    a component collection in the memory, including:
    a deduplicating backup processing component;
    a processor disposed in communication with the memory, and configured to issue a plurality of processing instructions from the component collection stored in the memory, wherein the processor issues instructions from the deduplicating backup processing component, stored in the memory, to:
        obtain, via at least one processor, a backup request datastructure associated with a first client, wherein the backup request datastructure identifies a source volume to backup;
        retrieve, via at least one processor, a master file table associated with the source volume;
        select from the master file table, a file entry associated with a file based on whether an amount of data corresponding to the selected file entry is above a threshold, wherein the amount of data corresponding to the selected file entry is fragmented across a plurality of file data runs associated with the source volume;
        reassemble, via at least one processor, the file in a buffer by appending the selected file entry with the amount of data that is fragmented across the plurality of data file runs;
        split, via at least one processor, the reassembled file into a set of file-based chunks in accordance with a specified maximum file-based chunk size;
        generate, via at least one processor, a file-based chunk identifier for a file-based chunk in the set of file chunks;
        determine, via at least one processor, that the file-based chunk with the generated file-based chunk identifier is not indexed in a global chunk index;
        store, via at least one processor, the file-based chunk on a target volume;
        index, via at least one processor, the file-based chunk in the global chunk index, wherein the global file-based chunk index facilitates retrieving the file-based chunk from the target volume using the file-based chunk identifier;
        generate, via at least one processor, a set of file-based chunk slice datastructures, wherein a file-based chunk slice datastructure in the set of file-based chunk slice datastructures maps source volume offset location of file data on the source volume to the corresponding file-based chunk offset location of that file data in the file-based chunk on the target volume including the amount of data that is fragmented across the plurality of data file runs;
        store, via at least one processor, the generated set of file-based chunk slice datastructures in a manifest file associated with the source volume; and
        monitor empty space locations and one or more unused space locations on the source volume by:
            retrieving, via at least one processor, a bitmap file associated with the source volume;
            determining, via at least one processor, empty space locations on the source volume using the bitmap file;
            generating, via at least one processor, a set of sparse chunk slice datastructures, wherein a sparse chunk slice datastructure in the set of sparse chunk slice datastructures specifies the one or more unused space locations on the source volume; and
            storing, via at least one processor, the generated set of sparse chunk slice datastructures in the manifest file associated with the source volume; and
            storing no data in the target volume corresponding to the empty space locations and the one or more unused space locations on the source volume.

2. The apparatus of claim 1, further comprising:
the processor issues instructions from the deduplicating backup processing component, stored in the memory, to:
    obtain, via at least one processor, a backup request datastructure associated with a second client, wherein the backup request datastructure identifies a second source volume to backup;
    retrieve, via at least one processor, a second master file table associated with the second source volume;
    select, via at least one processor, from the second master file table, a second file entry associated with the file;

determine, via at least one processor, a second set of file data runs associated with the selected second file entry;

reassemble, via at least one processor, the file in a second buffer using the determined second set of file data runs;

split, via at least one processor, the reassembled file into the set of file chunks;

generate, via at least one processor, the file-based chunk identifier for the file-based chunk in the set of file chunks;

determine, via at least one processor, that the file-based chunk with the generated file-based chunk identifier is already indexed in the global chunk index;

generate, via at least one processor, a second set of file-based chunk slice datastructures, wherein a file-based chunk slice datastructure in the second set of file-based chunk slice datastructures maps source volume offset location of file data on the second source volume to the corresponding file-based chunk offset location of that file data in the file-based chunk on the target volume; and store, via at least one processor, the generated second set of file-based chunk slice datastructures in a second manifest file associated with the second source volume.

3. The apparatus of claim 1, further comprising:
the processor issues instructions from the deduplicating backup processing component, stored in the memory, to:
sort, via at least one processor, file entries of the retrieved master file table to facilitate sequential reading of data from the source volume.

4. The apparatus of claim 3, wherein the file entries are sorted by first data run offset.

5. The apparatus of claim 1, wherein the file associated with the selected file entry exceeds a specified minimum threshold size.

6. The apparatus of claim 1, wherein the file associated with the selected file entry is not in a specified set of excluded files.

7. The apparatus of claim 1, wherein the file-based chunk identifier for the file-based chunk is generated by using a cryptographic hash function to calculate a checksum of the file-based chunk.

8. The apparatus of claim 1, wherein the target volume is one of: a distributed storage platform, a cloud storage service.

9. The apparatus of claim 1, wherein the file-based chunk is stored on the target volume compressed.

10. The apparatus of claim 1, wherein a file-based chunk slice datastructure in the generated set of file-based chunk slice datastructures includes the file-based chunk identifier of the file-based chunk.

11. The apparatus of claim 1, further comprising:
the processor issues instructions from the deduplicating backup processing component, stored in the memory, to:
determine, via at least one processor, a set of gap sections on the source volume;
create, via at least one processor, a gap chunk from a plurality of gap sections in the set of gap sections;
generate, via at least one processor, a gap chunk identifier for the created gap chunk;
store, via at least one processor, the gap chunk on the target volume;
index, via at least one processor, the gap chunk in the global chunk index;
generate, via at least one processor, a set of gap chunk slice datastructures, wherein a gap chunk slice datastructure in the set of gap chunk slice datastructures maps source volume offset location of a gap section on the source volume to the corresponding gap chunk offset location of that gap section in the gap chunk on the target volume; and
store, via at least one processor, the generated set of gap chunk slice datastructures in the manifest file associated with the source volume.

12. The apparatus of claim 1, further comprising:
the processor issues instructions from a restore processing component, stored in the memory, to:
obtain, via at least one processor, a restore request datastructure associated with the first client, wherein the restore request datastructure identifies the manifest file and a restore volume;
select, via at least one processor, a file-based chunk slice datastructure from the manifest file;
determine, via at least one processor, a file-based chunk identifier specified in the selected file-based chunk slice datastructure;
determine, via at least one processor, a file-based chunk offset location specified in the selected file-based chunk slice datastructure;
determine, via at least one processor, a source volume offset location specified in the selected file-based chunk slice datastructure; and
copy, via at least one processor, from the file-based chunk identified by the specified file-based chunk identifier and stored on the target volume, a portion identified by the specified file-based chunk offset location, to the restore volume at location identified by the specified source volume offset location.

13. The apparatus of claim 12, wherein the restore volume is an image file.

14. The apparatus of claim 1, further comprising:
the processor issues instructions from a virtual machine handling component, stored in the memory, to:
obtain, via at least one processor, a virtual machine initialization request datastructure associated with the first client, wherein the virtual machine initialization request datastructure identifies the manifest file and a copy-on-write file;
map, via at least one processor, the manifest file to a virtual disk;
subscribe, via at least one processor, to read notifications and write notifications associated with the virtual disk;
obtain, via at least one processor, a notification associated with the virtual disk;
determine, via at least one processor, specified data blocks associated with the notification;
determine, via at least one processor, that the specified data blocks were previously copied from the target volume to a cache associated with the virtual disk; and
use, via at least one processor, the copy-on-write file to handle the notification, wherein a read notification is handled by providing the specified data blocks from the copy-on-write file, and wherein a write notification is handled by updating the specified data blocks in the copy-on-write file.

15. A processor-readable multi-client backup deduplication non-transient physical medium storing processor-executable components, the components, comprising:

a component collection stored in the medium, including:

a deduplicating backup processing component; wherein the deduplicating backup processing component, stored in the medium, includes processor-issuable instructions to:

obtain, via at least one processor, a backup request datastructure associated with a first client, wherein the backup request datastructure identifies a source volume to backup;

retrieve, via at least one processor, a master file table associated with the source volume;

select from the master file table, a file entry associated with a file based on whether an amount of data corresponding to the selected file entry is above a threshold, wherein the amount of data corresponding to the selected file entry is fragmented across a plurality of file data runs associated with the source volume;

reassemble, via at least one processor, the file in a buffer by appending the selected file entry with the amount of data that is fragmented across the plurality of data file runs;

split, via at least one processor, the reassembled file into a set of file-based chunks in accordance with a specified maximum file-based chunk size;

generate, via at least one processor, a file-based chunk identifier for a file-based chunk in the set of file chunks;

determine, via at least one processor, that the file-based chunk with the generated file-based chunk identifier is not indexed in a global chunk index;

store, via at least one processor, the file-based chunk on a target volume;

index, via at least one processor, the file-based chunk in the global chunk index, wherein the global chunk index facilitates retrieving the file-based chunk from the target volume using the file-based chunk identifier;

generate, via at least one processor, a set of file-based chunk slice datastructures, wherein a file-based chunk slice datastructure in the set of file-based chunk slice datastructures maps source volume offset location of file data on the source volume to the corresponding file-based chunk offset location of that file data in the file-based chunk on the target volume including the amount of data that is fragmented across the plurality of data file runs;

store, via at least one processor, the generated set of file-based chunk slice datastructures in a manifest file associated with the source volume; and monitor empty space locations and one or more unused space locations on the source volume, by:

retrieving, via at least one processor, a bitmap file associated with the source volume;

determining, via at least one processor, empty space locations on the source volume using the bitmap file;

generating, via at least one processor, a set of sparse chunk slice datastructures, wherein a sparse chunk slice datastructure in the set of sparse chunk slice datastructures specifies the one or more unused space locations on the source volume; and storing, via at least one processor, the generated set of sparse chunk slice datastructures in the manifest file associated with the source volume; and storing no data in the target volume corresponding to the empty space locations and the one or more unused space locations on the source volume.

16. A processor-implemented multi-client backup deduplication system, comprising:

a memory means; and a deduplicating backup processing component means disposed in communication with the memory means, to:

obtain, via at least one processor, a backup request datastructure associated with a first client, wherein the backup request datastructure identifies a source volume to backup;

retrieve, via at least one processor, a master file table associated with the source volume;

select, via at least one processor, from the master file table, a file entry associated with a file;

determine, via at least one processor, a set of file data runs associated with the selected file entry;

reassemble, via at least one processor, the file in a buffer using the determined set of file data runs;

split, via at least one processor, the reassembled file into a set of file-based chunks in accordance with a specified maximum file-based chunk size;

generate, via at least one processor, a file-based chunk identifier for a file-based chunk in the set of file chunks;

determine, via at least one processor, that the file-based chunk with the generated file-based chunk identifier is not indexed in a global chunk index;

store, via at least one processor, the file-based chunk on a target volume;

index, via at least one processor, the file-based chunk in the global chunk index, wherein the global chunk index facilitates retrieving the file-based chunk from the target volume using the file-based chunk identifier;

generate, via at least one processor, a set of file-based chunk slice datastructures, wherein a file-based chunk slice datastructure in the set of file-based chunk slice datastructures maps source volume offset location of file data on the source volume to the corresponding file-based chunk offset location of that file data in the file-based chunk on the target volume;

store, via at least one processor, the generated set of file-based chunk slice datastructures in a manifest file associated with the source volume;

select one or more gaps corresponding to the source volume, the one or more gaps including one or more selected file entries including respective amounts of data below a threshold and empty space corresponding to the plurality of file data runs associated with the source volume;

split the one or more gaps into a plurality of gap chunks in accordance with a specified maximum gap chunk size; and generate a set of gap chunk slice datastructures corresponding to each of the plurality of gap chunks, wherein each of the plurality of gap chunk slice datastructures in the set of gap chunk slice datastructures maps source volume offset locations of data corresponding to the one or more selected gaps on the source volume to the corresponding gap chunk offset location in the gap chunk on the target volume.

17. A processor-implemented multi-client backup deduplication method, comprising:

executing processor-implemented deduplicating backup processing component instructions to:

obtain, via at least one processor, a backup request datastructure associated with a first client, wherein the backup request datastructure identifies a source volume to backup;

retrieve, via at least one processor, a master file table associated with the source volume;

select from the master file table, a file entry associated with a file based on whether an amount of data corresponding to the selected file entry is above a threshold, wherein the amount of data corresponding to the selected file entry is fragmented across a plurality of file data runs associated with the source volume;

reassemble, via at least one processor, the file in a buffer by appending the selected file entry with the amount of data that is fragmented across the plurality of file data runs;

split, via at least one processor, the reassembled file into a set of file-based chunks in accordance with a specified maximum file-based chunk size;

generate, via at least one processor, a file-based chunk identifier for a file-based chunk in the set of file chunks;

determine, via at least one processor, that the file-based chunk with the generated file-based chunk identifier is not indexed in a global chunk index;

store, via at least one processor, the file-based chunk on a target volume;

index, via at least one processor, the file-based chunk in the global chunk index, wherein the global chunk index facilitates retrieving the file-based chunk from the target volume using the file-based chunk identifier;

generate, via at least one processor, a set of file-based chunk slice datastructures, wherein a file-based chunk slice datastructure in the set of file-based chunk slice datastructures maps source volume offset location of file data on the source volume to the corresponding file-based chunk offset location of that file data in the file-based chunk on the target volume including the amount of data that is fragmented across the plurality of data file runs;

store, via at least one processor, the generated set of file-based chunk slice datastructures in a manifest file associated with the source volume;

select one or more gaps corresponding to the source volume, the one or more gaps including one or more selected file entries including respective amounts of data below the threshold and empty space corresponding to the plurality of file data runs associated with the source volume;

split the one or more gaps into a plurality of gap chunks in accordance with the specified maximum gap chunk size;

generate a set of gap chunk slice datastructures corresponding to each of the plurality of gap chunks, wherein each of the plurality of gap chunk slice datastructures in the set of gap chunk slice datastructures maps source volume offset locations of data corresponding to the one or more selected gaps on the source volume to the corresponding gap chunk offset location in the gap chunk on the target volume.

* * * * *